United States Patent
Zhou et al.

(10) Patent No.: US 12,273,884 B2
(45) Date of Patent: Apr. 8, 2025

(54) ELECTRONIC DEVICE, METHOD, AND STORAGE MEDIUM FOR WIRELESS COMMUNICATION SYSTEM

(71) Applicant: Sony Group Corporation, Tokyo (JP)

(72) Inventors: Zhengyi Zhou, Beijing (CN); Zhaocheng Wang, Beijing (CN); Ning Ge, Beijing (CN); Jianfei Cao, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 402 days.

(21) Appl. No.: 17/781,382

(22) PCT Filed: Dec. 22, 2020

(86) PCT No.: PCT/CN2020/138210
§ 371 (c)(1),
(2) Date: Jun. 1, 2022

(87) PCT Pub. No.: WO2021/129592
PCT Pub. Date: Jul. 1, 2021

(65) Prior Publication Data
US 2022/0417918 A1    Dec. 29, 2022

(30) Foreign Application Priority Data
Dec. 23, 2019   (CN) ......................... 201911334669.3

(51) Int. Cl.
*H04W 72/0446*   (2023.01)
*H04L 5/14*      (2006.01)
(Continued)

(52) U.S. Cl.
CPC ........... *H04W 72/20* (2023.01); *H04L 5/1469* (2013.01); *H04W 24/10* (2013.01); *H04W 72/0446* (2013.01)

(58) Field of Classification Search
None
See application file for complete search history.

(56) References Cited

U.S. PATENT DOCUMENTS

| 11,330,442 | B2 * | 5/2022 | Zhu | H04W 72/0446 |
| 2017/0367062 | A1 * | 12/2017 | Patel | H04W 72/1268 |

(Continued)

FOREIGN PATENT DOCUMENTS

| CN | 107734668 A | 2/2018 |
| CN | 107734688 A | 2/2018 |

(Continued)

OTHER PUBLICATIONS

International Search Report and Written Opinion mailed on Mar. 22, 2021, received for PCT Application PCT/CN2020/138210, Filed on Dec. 22, 2020, 8 pages including English Translation.

(Continued)

*Primary Examiner* — Duc T Duong
(74) *Attorney, Agent, or Firm* — XSENSUS LLP

(57) ABSTRACT

The present disclosure relates to an electronic device, a method, and a storage medium for a wireless communication system. Various embodiments for setting guard periods for downlink-to-uplink switching are described. An embodiment relates to an electronic device for a base station used in a TDD communication system, and the electronic device comprises a processing circuit. The processing circuit is configured to: set a first guard period for downlink-to-uplink switching for a first terminal device in a first cell; and set a second guard period for downlink-to-uplink switching for a second terminal device in the first cell, wherein the second guard period for downlink-to-uplink switching is different from the first guard period for downlink-to-uplink switching. The first guard period for downlink-to-uplink switching is associated with a first resource, the second guard period for downlink-to-uplink switching is associated with a second (Continued)

resource, and the first resource and the second resource have orthogonality.

16 Claims, 17 Drawing Sheets

(51) Int. Cl.
*H04W 24/10* (2009.01)
*H04W 72/20* (2023.01)

(56) References Cited

U.S. PATENT DOCUMENTS

| | | | |
|---|---|---|---|
| 2018/0139752 A1* | 5/2018 | Wang | H04B 7/2643 |
| 2019/0081768 A1* | 3/2019 | Zhang | H04L 5/0094 |
| 2019/0150131 A1 | 5/2019 | Chen et al. | |
| 2019/0223175 A1* | 7/2019 | Hakola | H04L 27/2605 |
| 2020/0077276 A1* | 3/2020 | Zhu | H04L 27/2607 |
| 2020/0205195 A1* | 6/2020 | Sun | H04W 74/0808 |
| 2020/0214006 A1 | 7/2020 | Choi | |
| 2021/0306127 A1* | 9/2021 | Sundberg | H04L 5/14 |

FOREIGN PATENT DOCUMENTS

| | | |
|---|---|---|
| CN | 110324906 A | 10/2019 |
| EP | 3500015 A1 | 6/2019 |
| WO | 2018/058630 A1 | 4/2018 |
| WO | 2018/201338 A1 | 11/2018 |
| WO | WO-2019050381 A1 | 3/2019 |

OTHER PUBLICATIONS

CMCC, "Discussion on supporting TDD duplex scheme for NTN", 3GPP TSG RAN WG1 #99, R1-1912538, Nov. 18-22, 2019, pp. 1-11.

* cited by examiner

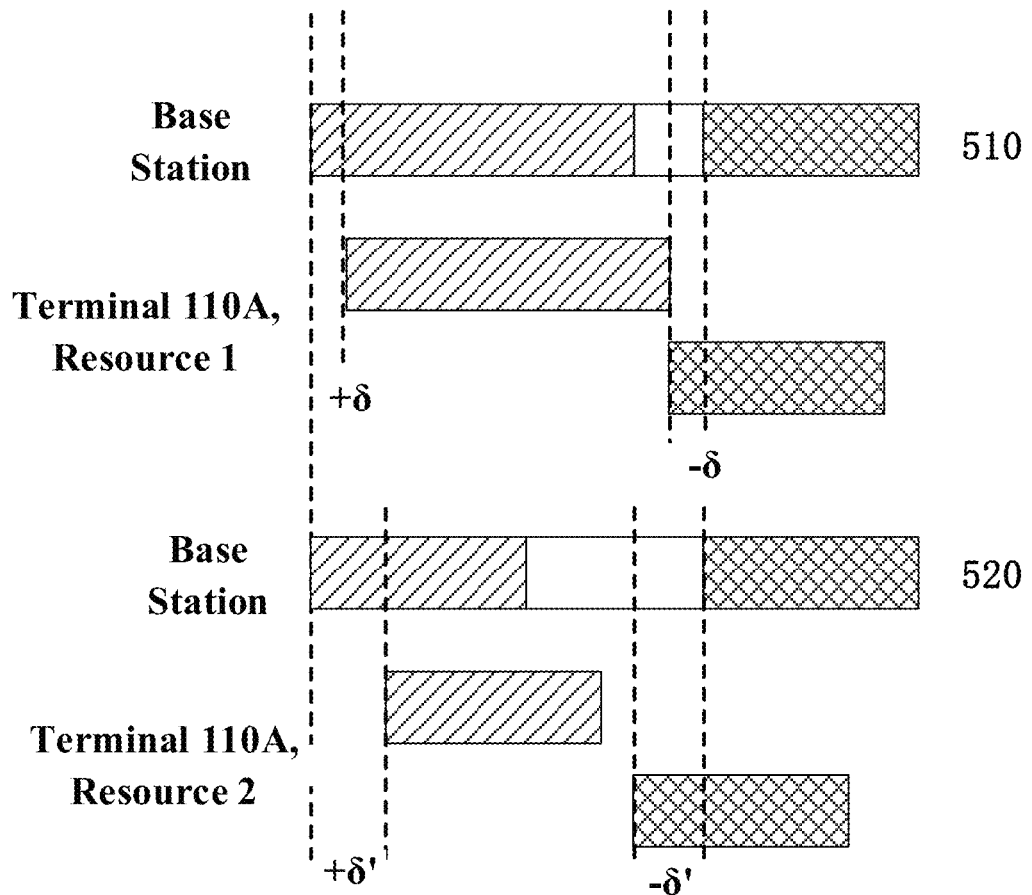
Fig. 5B

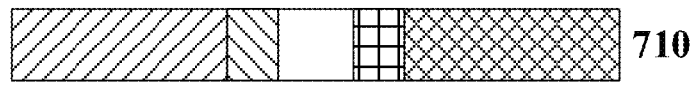
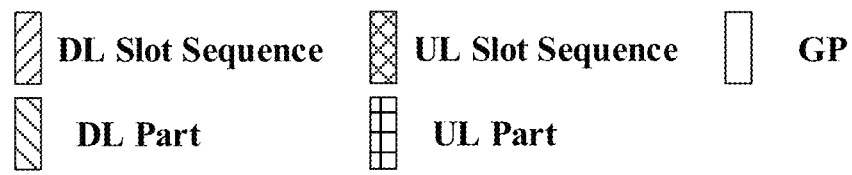
Fig. 7
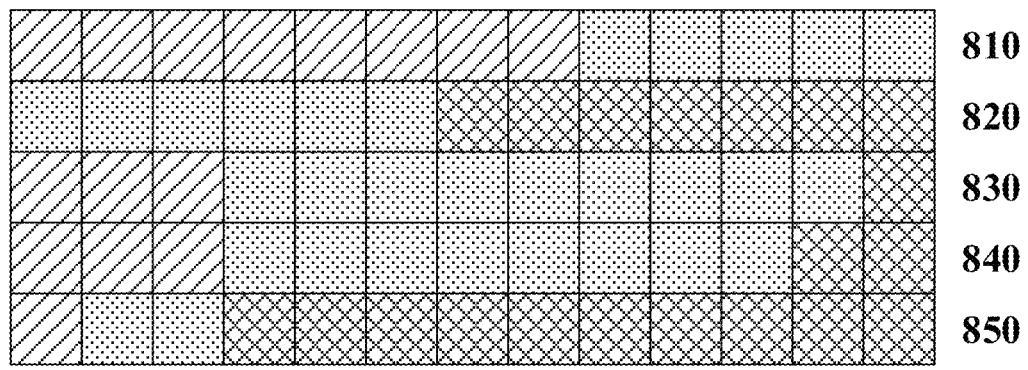
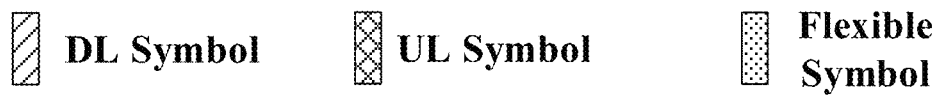
Fig. 8

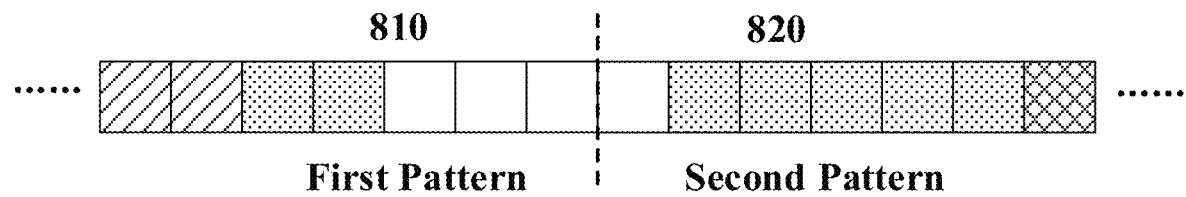
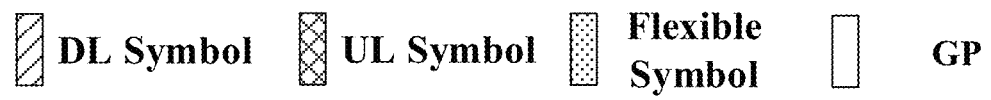
Fig. 9
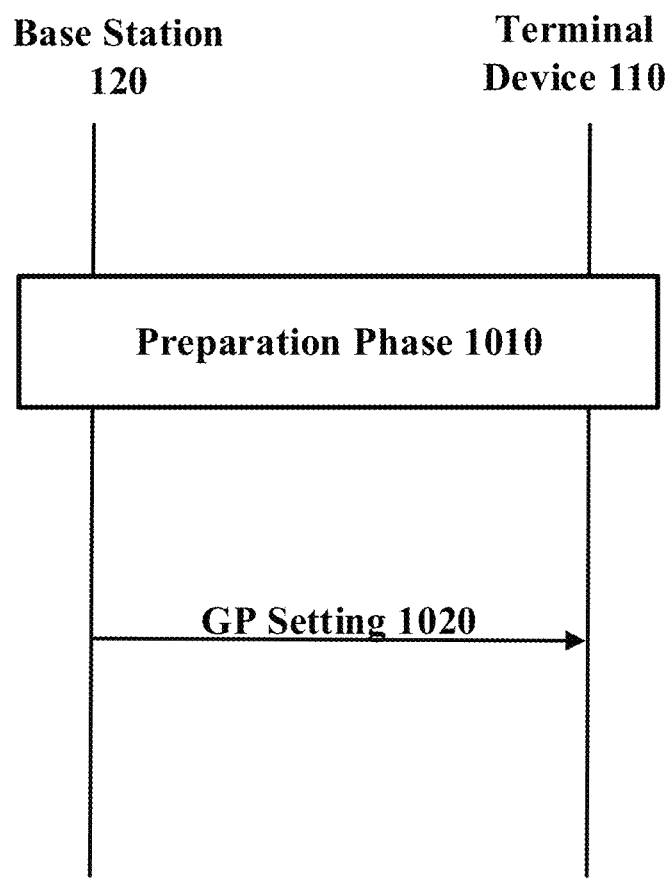
Fig. 10

1100

```
┌─────────────────────────────────────┐
│ Set a first guard period for downlink-to- │
│ uplink switching for a first terminal device │
│         in a first cell             │
└─────────────────────────────────────┘
                  │
                  │         1105
                  ▼
┌─────────────────────────────────────┐
│ Set a second guard period for downlink-to- │
│ uplink switching for a second terminal │
│       device in the first cell      │
└─────────────────────────────────────┘
                  │
                  │         1110
                  ▼
┌ ─ ─ ─ ─ ─ ─ ─ ─ ─ ─ ─ ─ ─ ─ ─ ─ ─ ─ ┐
  Set a third guard period for downlink-to-
│ uplink switching for the first terminal │
                 device
└ ─ ─ ─ ─ ─ ─ ─ ─ ─ ─ ─ ─ ─ ─ ─ ─ ─ ─ ┘
                            1115
```

Fig. 11

ELECTRONIC DEVICE, METHOD, AND STORAGE MEDIUM FOR WIRELESS COMMUNICATION SYSTEM

CROSS-REFERENCE TO RELATED APPLICATIONS

The present application is based on PCT/CN2020/138210 filed on Dec. 22, 2020, which claims priority to Chinese Patent Application No. 201911334669.3, filed on Dec. 23, 2019, each of which is incorporated herein by reference in its entirety.

TECHNICAL FIELD

The present disclosure generally relates to a wireless communication system and a wireless communication method, and specifically, to technology for setting guard periods for downlink-to-uplink switching.

BACKGROUND

With development and application of the wireless communication technologies, people's needs for voice and data communication have been unprecedentedly met. In order to provide even higher communication quality and capacity, a wireless communication system employs various technologies at different layers. The duplex technology has a time division duplex (TDD) mode. In TDD mode, uplink and downlink using the same frequency band may be separated in time (namely time division). For example, in a TDD wireless communication system, time resources may be allocated for uplink and downlink in different proportions, and uplink and downlink transmissions are performed on the same frequency channel (for example, carrier) based on the allocated time resources, to separate uplink from downlink. Accordingly, there is a guard period for switching from downlink transmission to uplink transmission.

SUMMARY

A first aspect of the present disclosure relates to an electronic device for a base station, the base station is used in a TDD communication system, and the electronic device includes a processing circuit. The processing circuit is configured to: set a first guard period for downlink-to-uplink switching for a first terminal device in a first cell; and set a second guard period for downlink-to-uplink switching for a second terminal device in the first cell, wherein the second guard period for downlink-to-uplink switching is different from the first guard period for downlink-to-uplink switching. The first guard period for downlink-to-uplink switching is associated with a first resource, the second guard period for downlink-to-uplink switching is associated with a second resource, and the first resource and the second resource have orthogonality.

A second aspect of the present disclosure relates to an electronic device for a first terminal device, the first terminal device is used in a TDD communication system, and the electronic device includes a processing circuit. The processing circuit is configured to: receive a first guard period for downlink-to-uplink switching set by a base station, wherein the first guard period for downlink-to-uplink switching is different from a second guard period for downlink-to-uplink switching set by the base station for a second terminal device in a same cell. The first guard period for downlink-to-uplink switching is associated with a first resource, the second guard period for downlink-to-uplink switching is associated with a second resource, and the first resource and the second resource have orthogonality.

A third aspect of the present disclosure relates to a method for a TDD communication system, includes by a base station: setting a first guard period for downlink-to-uplink switching for a first terminal device in a first cell; and setting a second guard period for downlink-to-uplink switching for a second terminal device in the first cell, wherein the second guard period for downlink-to-uplink switching is different from the first guard period for downlink-to-uplink switching. The first guard period for downlink-to-uplink switching is associated with a first resource, the second guard period for downlink-to-uplink switching is associated with a second resource, and the first resource and the second resource have orthogonality.

A fourth aspect of the present disclosure relates to a method for a TDD communication system, includes by a first terminal device: receiving a first guard period for downlink-to-uplink switching set by a base station, wherein the first guard period for downlink-to-uplink switching is different from a second guard period for downlink-to-uplink switching set by the base station for a second terminal device in a same cell. The first guard period for downlink-to-uplink switching is associated with a first resource, the second guard period for downlink-to-uplink switching is associated with a second resource, and the first resource and the second resource have orthogonality.

A fifth aspect of the present disclosure relates to a computer-readable storage medium having one or more instructions stored thereon. In some embodiments, the one or more instructions may, when executed by one or more processors of an electronic device, cause the electronic device to perform the methods according to various embodiments of the present disclosure.

A sixth aspect of the present disclosure relates to an apparatus for wireless communication, including components or units for performing operations of the methods according to the embodiments of the present disclosure.

The above summary is provided to summarize some exemplary embodiments in order to provide a basic understanding of the various aspects of the subject matter described herein. Therefore, the above-described features are merely examples and should not be construed as limiting the scope or spirit of the subject matter described herein in any way. Other features, aspects, and advantages of the subject matter described herein will become apparent from the Detailed Description described below in conjunction with the drawings.

BRIEF DESCRIPTION OF THE DRAWINGS

A better understanding of the present disclosure can be achieved by referring to the detailed description given hereinafter in conjunction with the accompanying drawings. The same or similar reference numerals are used in the accompanying drawings to denote the same or similar components. The accompanying drawings together with the following detailed description are included in the specification and form a part of the specification, and are intended to exemplify the embodiments of the present disclosure and explain the principles and advantages of the present disclosure. In the accompanying drawings:

FIGS. 5A-9 illustrate example settings of guard periods for downlink-to-uplink switching in accordance with embodiments herein.

FIG. 10 illustrates an exemplary flow for setting guard periods in accordance with embodiments herein.

FIGS. 11 and 12 illustrate exemplary methods for a TDD communication system in accordance with embodiments herein.

Although the embodiments described in the present disclosure may have various modifications and alternatives, specific embodiments thereof are illustrated as examples in the accompany drawings and described in detail in this specification. It should be understood that the drawings and detailed description thereof are not intended to limit embodiments to the specific forms disclosed, but to cover all modifications, equivalents, and alternatives falling within the spirit and scope of the claims.

DETAILED DESCRIPTION

The following describes representative applications of various aspects of the device and method according to the present disclosure. The description of these examples is merely to add context and help to understand the described embodiments. Therefore, it is clear to those skilled in the art that the embodiments described below can be implemented without some or all of the specific details. In other instances, well-known process steps have not been described in detail to avoid unnecessarily obscuring the described embodiments. Other applications are also possible, and the solution of the present disclosure is not limited to these examples.

Figure 1:
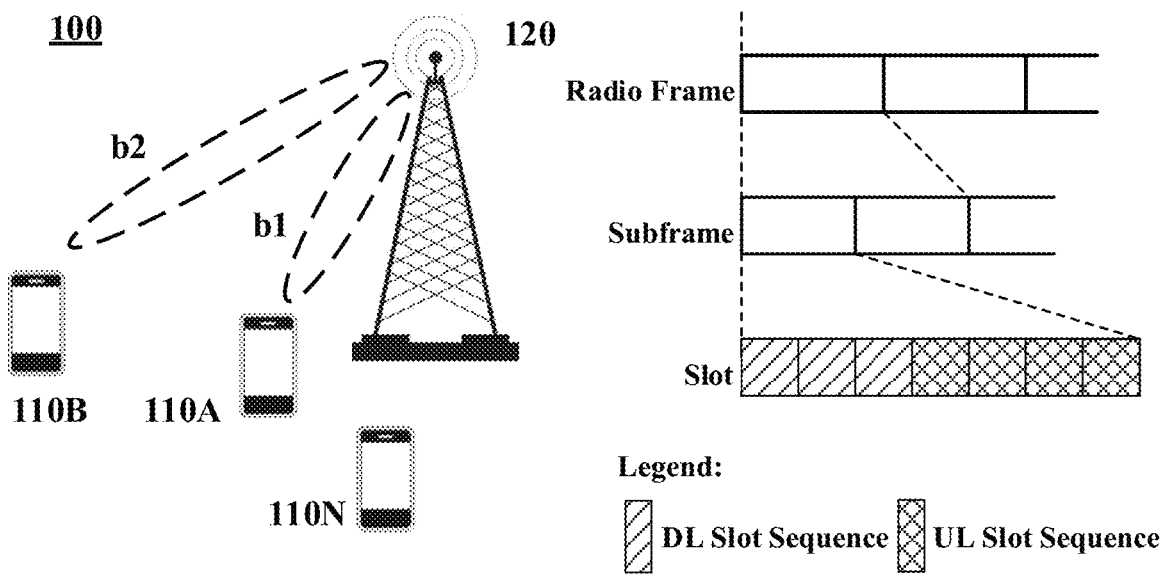
FIG. 1 illustrates an exemplary wireless communication system according to embodiments.

FIG. 1 illustrates an exemplary wireless communication system according to embodiments. It should be understood that FIG. 1 illustrates only one of multiple types and possible arrangements of wireless communication systems, and embodiments of the present disclosure can be implemented in any one of the various systems based on needs.

As shown in FIG. 1, a wireless communication system 100 includes a base station 120 and one or more terminal devices 110A and 110B-110N (which can be collectively referred to as terminal devices 110). The base stations and the terminal devices can be configured to communicate through a transmission medium. The base station 120 can be configured to communicate with a network (for example, a core network of a cellular service provider, a telecommunications network such as a public switched telephone network (PSTN), and/or the Internet). Therefore, the base station 120 can facilitate communication between the terminal devices 110A-110N and/or between the terminal devices 110A-110N and the network.

It should be understood that the term base station herein has the full breadth of its normal meaning, and at least includes a wireless communication station serving as a part of a wireless communication system or a radio system, to facilitate communication. Examples of a base station may include but are not limited to the following: at least one of a base transceiver station (BTS) and a base station controller (BSC) in a GSM system; at least one of a radio network controller (RNC) and a Node B in a WCDMA system; eNBs in LTE and LTE-Advanced systems; access points (APs) in WLAN and WiMAX systems; and corresponding network nodes in communication systems to be developed or under development (for example, a gNB in a 5G New Radio (NR) system or an eNB in eLTE). Part of functions of a base station herein can also be implemented as an entity that has control functions on communication in the D2D, M2M, and V2V communication scenarios, or as an entity that plays a role of spectrum coordination in the cognitive radio communication scenario.

The term terminal herein has the full breadth of its normal meaning, for example, a terminal may be a mobile station (MS), user equipment (UE), and so on. A terminal can be implemented as a device such as a mobile phone, a vehicle, a handheld device, a media player, a computer, a laptop or a tablet, or a wireless device of almost any type. In some cases, a terminal may communicate using multiple wireless communication technologies. For example, a terminal may be configured to communicate using two or more of GSM, UMTS, CDMA2000, WiMAX, LTE, LTE-A, WLAN, NR, Bluetooth, and so on. In some cases, a terminal may alternatively be configured to communicate using only one wireless communication technology.

The coverage area of the base station 120 may be referred to as a cell. The base station 120 and other similar base stations (not shown) operating in accordance with one or more cellular communication technologies can provide continuous or nearly continuous communication signal coverage to the terminal devices 110 and similar devices. Terminal devices 110A and 110B may be located in a same cell of the base station 120. In an embodiment, the base station 120 may communicate with the terminal devices 110 using a beamforming technology. Beamforming can provide beamforming gain to compensate for the propagation loss of wireless signals by increasing antenna directivity for transmission and/or reception. This is beneficial for wireless communication systems such as NR (New Radio) systems that operate in the millimeter-wave (mmWave) frequency band where signal propagation loss is large. In the example of FIG. 1, the base station 120 communicates with the terminal 110A using beam b1 and communicates with the terminal 110B using beam b2 based on the matching of transmit and receive beams between the base station and the terminals.

In an embodiment, the wireless communication system 100 can be a wireless communication system that employs Time Division Duplex (TDD) techniques. Unlike a Frequency Division Duplex (FDD) system that distinguishes an uplink from a downlink by different frequency bands, in a TDD system, uplink and downlink transmissions are both performed in the same frequency bands but at different times. The right side of FIG. 1 illustrates a signal format example of a physical channel in a TDD system. The physical channel can include radio frames, and a single radio frame can be of a certain size. A single radio frame can consist of multiple (e.g., 2) subframes, and a single subframe can include multiple time slots (or "slots" hereinafter for short), which in turn can include multiple symbols (e.g., OFDM symbols). In a physical channel, slots can be allocated in a certain proportion for uplink or downlink transmission. In the example of FIG. 1, the first 3 slots in a single subframe are allocated for downlink transmission and the last 4 slots are allocated for uplink transmission.

It should be understood that the signal format in FIG. 1 is only one example arrangement of slots, symbols in a physical channel. Embodiments herein are not limited in this respect. As wireless communication systems evolve, the constituent elements or hierarchies of the signal formats can change, but such changes do not affect the use of the embodiments herein.

In an embodiment, the base station 120 can perform signaling interaction with a plurality of terminal devices 110 through at least one of higher layer signaling (e.g., Radio Resource Control (RRC) signaling) and physical layer signaling (e.g., downlink control information (DCI), uplink control information (UCI) in the NR system), to configure transmission parameters of the respective terminal devices 110.

Figure 2A:
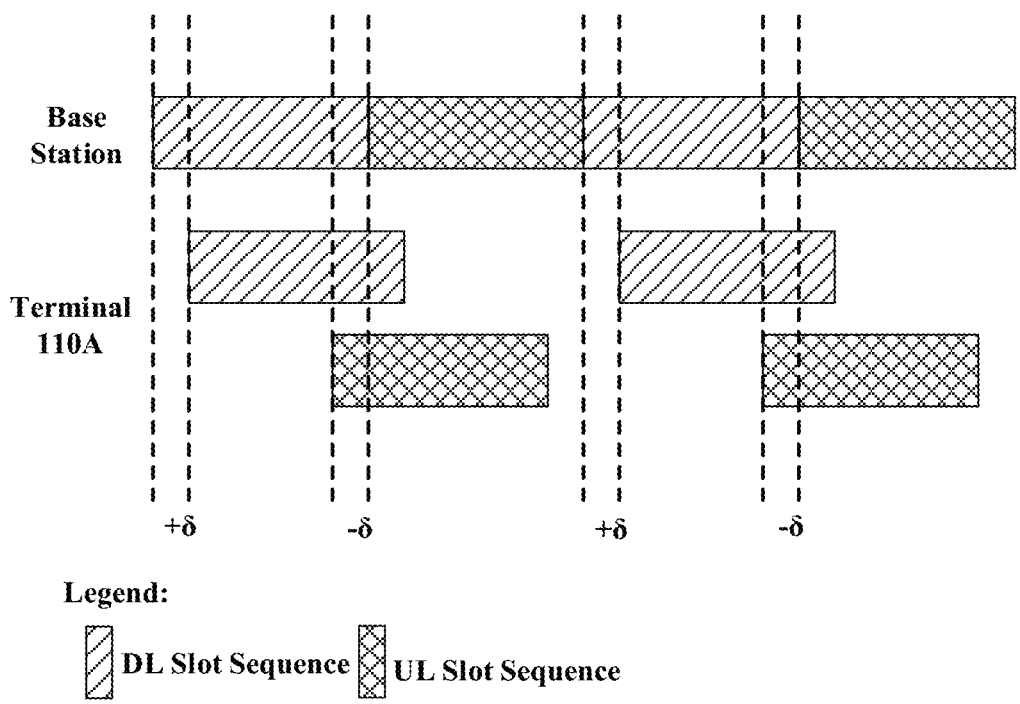
FIGS. 2A and 2B illustrate Timing Advance (TA) and Guard Period (GP) for downlink-to-uplink switching in a wireless communication system respectively.

The concept of uplink Timing Advance (TA) and Guard Period (GP) for downlink-to-uplink switching in the TDD system is described below with reference to FIGS. 2A and 2B. In general, the time of the base station side is synchronized with the system time, and the slot sequence of the base station side is aligned with the slot sequence in the physical channel of the system. Because there is a corresponding physical distance between the base station and each terminal device, there is a corresponding signal propagation delay between the base station and each terminal device. The propagation delay causes the slot sequences on the terminal device side and the base station side not to be aligned. As shown in FIG. 2A, assuming that the signal propagation delay between the base station 120 and the terminal device 110A is $\delta$, then: in the downlink, the slot sequence for the terminal device 110A is delayed by $\delta$ relative to the base station 120; in the uplink, the terminal device 110A should advance its uplink slot sequence by $\delta$ relative to the base station 120 in order for its transmitted uplink signal to be received at a corresponding uplink slot sequence of the base station 120 (which is a requirement for the terminal device to maintain synchronization with the base station). Therefore, the amount of advance of the uplink slot sequence being advanced relative to the downlink slot sequence being delayed for the terminal device 110A is referred to as the timing advance. In the example of FIG. 2A, the advance value is 2 times of the delay value $\delta$.

As shown in FIG. 2A, the uplink transmission by the terminal device based on the timing advance may collide with the delayed downlink reception, i.e., coincide in time. A terminal device in the TDD mode typically does not have capability to simultaneously receive downlink and transmit uplink due to, for example, hardware performance limitations. In order to prevent collision between the delayed downlink slot sequence and the advanced uplink slot sequence, the uplink slot sequence needs to be moved backward in the physical channel of the system. This is represented by inserting a guard period after the downlink slot sequence and before the uplink slot sequence, as shown in FIG. 2B. In the case where the guard period is sufficiently large, the above-described collision does not occur even if the uplink slot sequence of the terminal device is advanced by $\delta$ relative to the uplink slot sequence of the base station 120.

Conventionally, a uniform guard period can be set at a cell level. For example, the uniform guard period can be set based on a delay of the terminal device having the largest propagation delay with the base station. In the example of FIG. 2B, the guard period is set based on the time delay $\delta'$ of the terminal device 110B. It will be appreciated that the guard period length Lgp should be equal to or greater than 2 times of the delay $\delta'$ in order not to cause collisions.

Figure 2B:
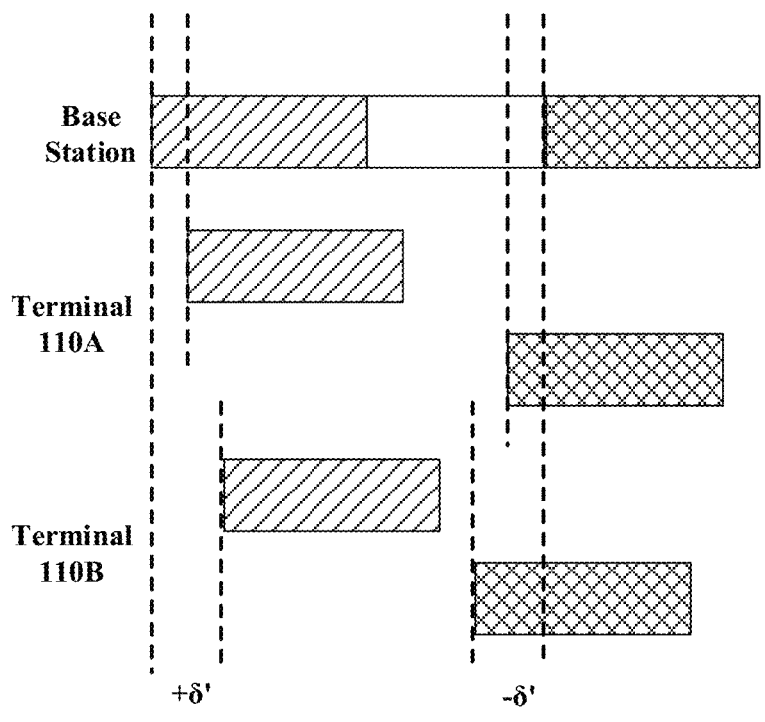

Under the uniform guard period in FIG. 2B, in order to avoid collision for the terminal device 110B having the largest propagation delay with the base station, the terminal device 110A having a smaller propagation delay with the base station cannot transmit and receive signals within the time of Lgp-2$\delta$. For the system, no signals transmission and reception within such a long guard period means the time and/or frequency resources are idle and wasted.

Therefore, to replace the uniform guard period, a terminal device-specific guard period can be set in the embodiment herein. Each terminal device can have an appropriate guard period (e.g., an appropriate size and slot position), so that each terminal device can utilize time and/or frequency resources to a greater extent, thereby improving resource utilization efficiency.

Figure 3A:
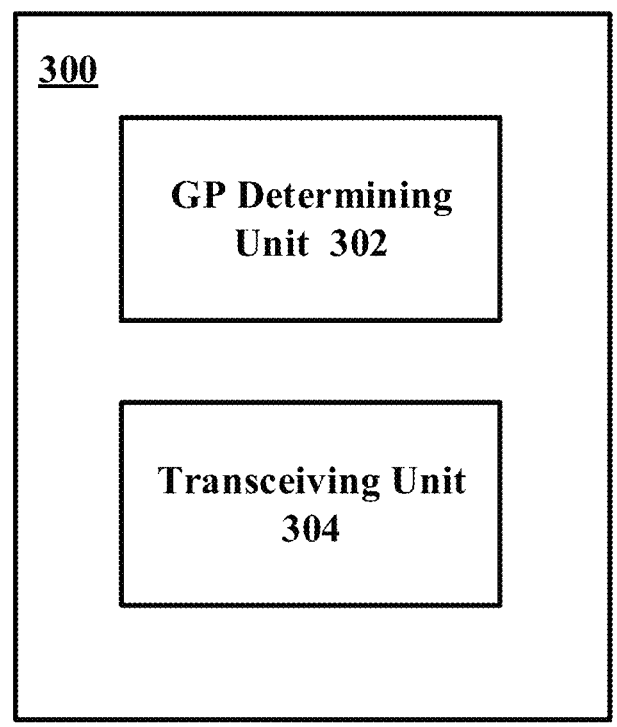
FIGS. 3A and 3B illustrate exemplary electronic devices for a base station and a terminal device respectively in accordance with embodiments herein.

FIG. 3A illustrates an exemplary electronic device for a base station side according to embodiments herein, where the base station can be used in a TDD wireless communication system. The electronic device 300 shown in FIG. 3A may include various units to implement various embodiments according to the present disclosure. The electronic device 300 can include a guard period determining unit 302 and a transceiving unit 304. In different implementations, the electronic device 300 can implemented as the base station 120 in FIG. 1 or a part thereof, or as a device used to control the base station 120 or otherwise related to the base station 120 (such as a base station controller) or a part of the device. Various operations described below with reference to the base station may be implemented by the units 302 to 304 of the electronic device 300 or other possible units.

In an embodiment, the guard period determining unit 302 can be configured to set a first guard period for downlink-to-uplink switching for a first terminal device in a first cell, and set a second guard period for downlink-to-uplink switching for a second terminal device in the first cell, wherein the second guard period for downlink-to-uplink switching is different from the first guard period for downlink-to-uplink switching. In an embodiment, the first guard period for downlink-to-uplink switching is associated with a first resource, the second guard period for downlink-to-uplink switching is associated with a second resource, and the first resource and the second resource have orthogonality.

Referring to the example of FIG. 1, the first and second guard periods for downlink-to-uplink switching, which are different, can be set for terminal devices 110A and 110B in a same cell of the base station 120. Since beams b1 and b2 are respectively used for communication with the terminal devices 110A and 110B, different beams b1 and b2 can be considered as orthogonal resources, the different first and second guard periods for downlink-to-uplink switching can be set through the beams b1 and b2. Alternatively or additionally, the frequency resources used by the terminal devices 110A and 110B can be orthogonal. For example, their frequency resources can be located in different frequency bands or be allocated to the terminal devices 110A and 110B in an orthogonal frequency division multiplexing manner. In such an approach, the different first and second guard periods for downlink-to-uplink switching can be set through different or orthogonal frequency division multiplexed frequency resources.

Alternatively or additionally, the guard period determining unit 302 can be configured to set a first guard period for downlink-to-uplink switching for a first terminal device in a first cell, and to set a third guard period for downlink-to-uplink switching for the first terminal device, where the third guard period for downlink-to-uplink switching is different from the first guard period for downlink-to-uplink switching. In an embodiment, the first guard period for downlink-to-uplink switching is associated with a first resource, the third guard period for downlink-to-uplink switching is associated with a third resource, and the first resource and the third resource have orthogonality.

Referring to the example of FIG. 1, the first and third guard periods for downlink-to-uplink switching, which are different, can be set for the terminal device 110A of the base station 120. In some cases, multiple beams of the base station 120 can be used for communication with a single terminal device. Assuming that beams b1 and b1' are both used for communication with the terminal device 110A, different beams b1 and b1' can be considered as orthogonal resources, thus the different first and third guard periods for downlink-to-uplink switching can be set through beams b1 and b1'. Alternatively or additionally, the terminal device 110A can use multiple frequency resources which are orthogonal. For example, the frequency resources can be located in different frequency bands or be orthogonal frequency division multiplexed. In such an approach, the different first and third guard periods for downlink-to-uplink switching can be set through different or orthogonal frequency division multiplexed frequency resources.

In an embodiment, the transceiving unit 304 can be configured to perform control so as to conduct necessary transceiving of information with respective terminal devices. For example, the transceiving unit 304 can be configured to perform control to transceive various signaling and data.

Figure 3B:
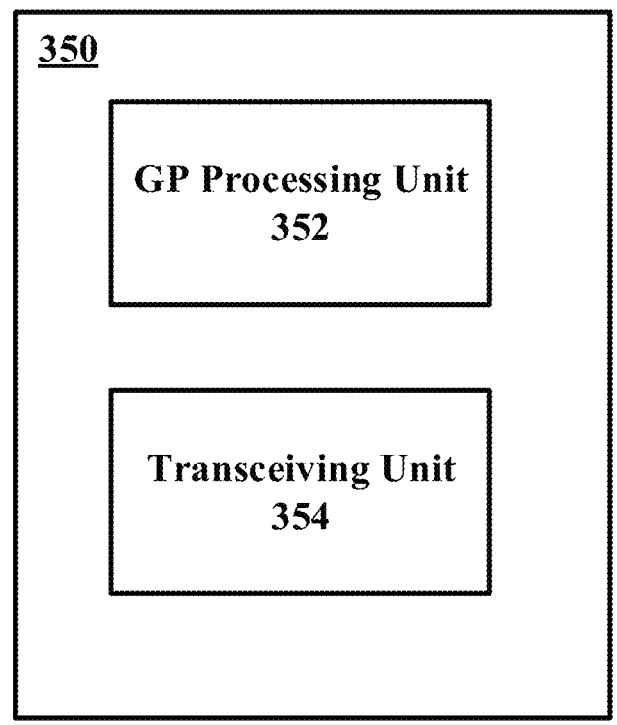

FIG. 3B illustrates an exemplary electronic device for a terminal device side according to embodiments herein, where the terminal device can operate in the TDD mode. The electronic device 350 shown in FIG. 3B may include various units to implement various embodiments according to the present disclosure. The electronic device 350 may include a guard period processing unit 352 and a transceiving unit 354. In various implementaions, the electronic device 350 may be implemented as any of the terminal devices in FIG. 1 or a portion thereof. The various operations described below in connection with the terminal device may be implemented by the units 352 and 354 of the electronic device 350 or other possible units.

In the example of FIG. 3B, the guard period processing unit 352 can be configured to receive a first guard period for downlink-to-uplink switching set by a base station, wherein the first guard period for downlink-to-uplink switching is different from a second guard period for downlink-to-uplink switching set by the base station for a second terminal device in a same cell. In an embodiment, the first guard period for downlink-to-uplink switching is associated with a first resource, the second guard period for downlink-to-uplink switching is associated with a second resource, and the first resource and the second resource have orthogonality.

Referring to the example of FIG. 1, the terminal devices 110A and 110B can receive different first and second guard periods for downlink-to-uplink switching respectively from the base station 120. The different first and second guard periods for downlink-to-uplink switching can be set through the beams b1 and b2 for the terminal devices 110A and 110B, or the different first and second guard periods for downlink-to-uplink switching can be set through different or orthogonal frequency division multiplexed frequency resources.

Alternatively or additionally, the guard period processing unit 352 can be configured to receive a first guard period and a third guard period for downlink-to-uplink switching set by the base station, where the third guard period for downlink-to-uplink switching is different from the first guard period for downlink-to-uplink switching. In an embodiment, the first guard period for downlink-to-uplink switching is associated with a first resource, the third guard period for downlink-to-uplink switching is associated with a third resource, and the first resource and the third resource have orthogonality.

Referring to the example of FIG. 1, the terminal device 110A can receive the different first and third guard periods for downlink-to-uplink switching set thereto from the base station 120. The different first and third guard periods for downlink-to-uplink switching can be set through the beams b1 and b1' for the terminal device 110A, or the different first and third guard periods for downlink-to-uplink switching can be set through different or orthogonal frequency division multiplexed frequency resources.

In the example of FIG. 3B, the transceiving unit 354 can be configured to perform control so as to conduct necessary transceiving of information with the base station. For example, the transceiving unit 354 can be configured to perform control to transceive various signaling and data.

In some embodiments, the electronic devices 300 and 350 may be implemented at the chip level, or may be implemented at the device level by including other external components (such as radio links and antennas). For example, each electronic device can work as a communication device as a whole machine.

It should be understood that the foregoing various units are only logical modules divided based on logical functions to be implemented by the units, and are not intended to limit specific implementations, for example, the units may be implemented by software, hardware, or a combination of software and hardware. In actual implementation, the above various units may be implemented as independent physical entities, or may be implemented by a single entity (for example, a processor (CPU, DSP, or the like), or an integrated circuit). The processing circuitry may refer to various implementations of a digital circuitry, an analog circuitry, or a mixed signal (combination of analog and digital) circuitry that perform functions in a computing system. The processing circuitry can include, for example, a circuit such as an integrated circuit (IC), an application specific integrated circuit (ASIC), a portion or circuit of a separate processor core, the entire processor core, a separate processor, a programmable hardware device such as a field programmable gate array (FPGA), and/or a system including multiple processors.

Exemplary electronic devices and operations performed according to embodiments are briefly described above with reference to FIGS. 3A and 3B. Details of these operations are described further below.

In some embodiments, different guard periods for downlink-to-uplink switching can be set for different terminal devices and/or multiple guard periods for downlink-to-uplink switching can be set for a single terminal device, by setting different guard periods and associating each guard period with a respective orthogonal resource. An example of orthogonal resources according to an embodiment is described below in conjunction with FIGS. 4A-4D.

Figure 4A:
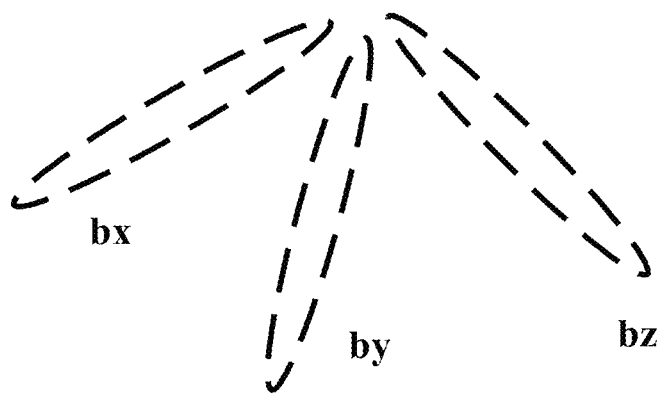
FIGS. 4A-4D illustrate resource examples in a wireless communication system respectively in accordance with embodiments herein.

In some embodiments, the orthogonal resources can be different beams. FIG. 4A illustrates 3 different beams bx, by and bz in a same cell. These 3 beams have different pointing directions and can be at a same beam level. For example, in FIG. 4A, the 3 beams are all fine beams. These 3 beams can respectively have guard periods associated therewith, and the values of the guard periods can be the same or different. In the case where the beams bx, by, and bz are respectively used for different terminal devices, the guard period values associated with the beams can be valid for the respective terminal devices. In different beam pointing directions and arrangements, there can be cases where there are more than 1 beam (e.g., beams bx and by) serving a single terminal device. In this case, the guard period values associated with beams bx and by can both be valid for that single terminal device.

Figure 4B:
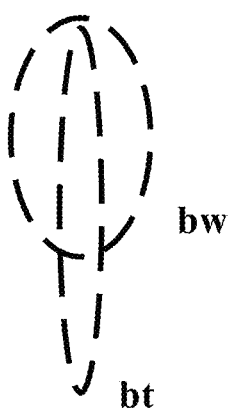

FIG. 4B illustrates 2 different beams bw and bt in a same cell. These 2 beams have substantially the same pointing directions but at different beam levels. For example, in FIG. 4B, beam bw is a coarse beam and beam bt is a fine beam. These 2 beams can respectively have guard period associated therewith, and the values of the guard periods can be the same or different. In the case where the beams bw and bt are respectively used for different terminal devices, the guard period values associated with the beams can be valid for the respective terminal devices. In various beam pointing directions and arrangements, there can be cases where there are more than 1 beam (e.g., beams bw and bt) serving a single terminal device. In this case, the guard period values associated with beams bw and bt can both be valid for that single terminal device.

Figure 4C:
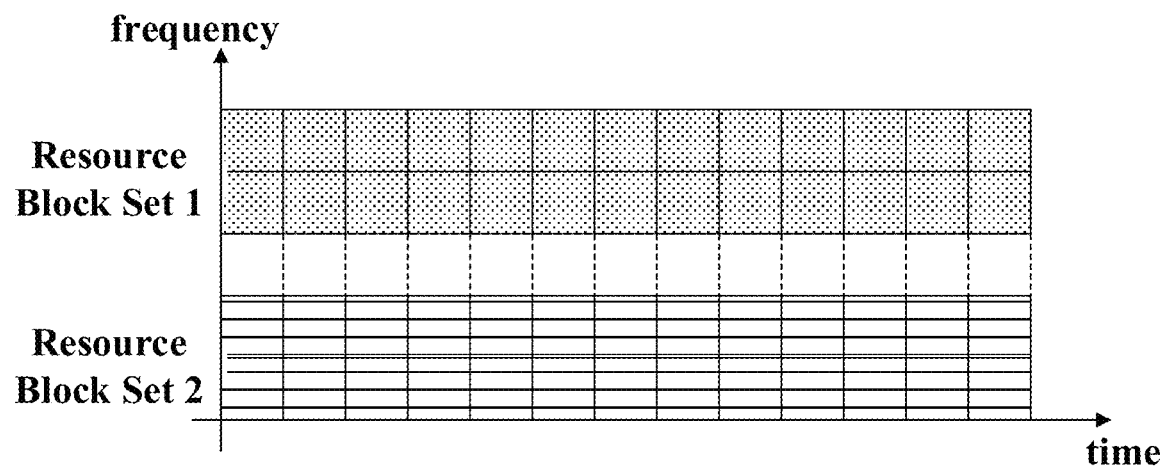

In some embodiments, the orthogonal resources can be different frequency resources. FIG. 4C illustrates resource block sets 1 and 2 allocated for a same cell. The sets 1 and 2 can include resource blocks located in different subcarriers or can include resource blocks located in different frequency bands. Sets 1 and 2 can respectively have guard periods associated therewith, and the values of the guard periods can be the same or different. In the case where sets 1 and 2 are used for different terminal devices respectively, the guard period value associated with the resource block sets can be valid for the respective terminal devices. In different resource allocations, there can be cases where more than 1 set of resource blocks are used for a single terminal device. In this case, the guard period values associated with these sets of resource blocks can all be valid for that single terminal device.

Figure 4D:
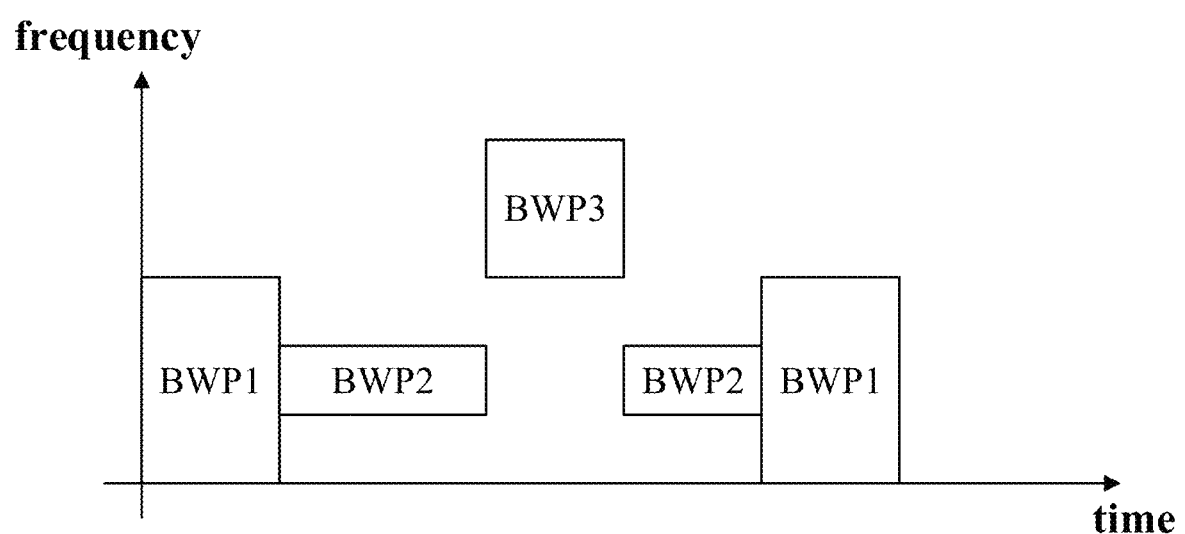

FIG. 4D illustrates a scenario where multiple sets of resource blocks are allocated for a single terminal device in a same cell. The multiple resource blocks can be, for example, Bandwidth Parts (BWPs) in an NR system. The NR system can support bandwidths from 5 MHz to 400 MHz. A large bandwidth corresponds to high sampling rates and high power consumption, and it may be difficult for most terminal devices to support large bandwidths such as 50 MHz, 100 MHz, 200 MHz, 400 MHz. Alternatively, to reduce the requirements on the terminal device, the terminal device can be made to operate in corresponding BWPs in a large bandwidth. In the example of FIG. 4D, 3 bandwidth parts BWP1 to BWP3 are configured. BWP1 to BWP3 can each have an associated guard period, and values of the guard period can be the same or different. In the case where BWP1 to BWP3 are respectively used for different terminal devices, the guard period values associated with BWP1 to BWP3 can be valid for the respective terminal devices. In the case where BWP1 to BWP3 are used for a single terminal device, the guard period values associated with BWP1 to BWP3 can all be valid for that single terminal device.

Examples of the orthogonal resources is described above in connection with beams and frequency resource blocks. In an embodiment, the orthogonal resources may not be limited thereto, and may be other resources different in time or space, for example. Additionally, resource orthogonality is resource orthogonality greater than a threshold level (if not complete orthogonality).

Figure 5A:
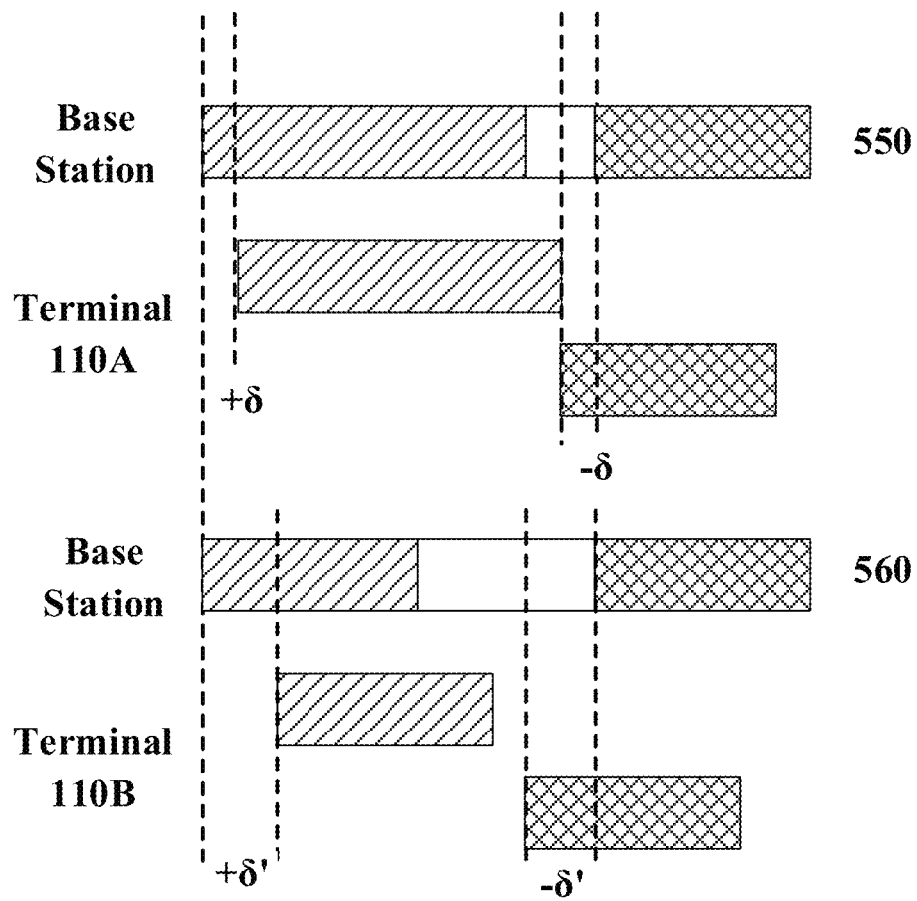

FIG. 5A illustrates an exemplary guard period setting according to embodiments. In some embodiments, there can be signal formats of physical channels at the terminal device level in the system. The base station maintains synchronization with the corresponding terminal device based on each signal format so that the base station and the terminal device achieve alignment at the slot or symbol level. As shown in FIG. 5A, different signal formats 550 and 560 are configured for terminal devices 110A and 110B. Signal formats 550 and 560 include a sequence of downlink slots, a guard period, and a sequence of uplink slots that occur repeatedly, and FIG. 5A illustrates only one cycle of the sequence of downlink slots, the guard period, and the sequence of uplink slots. In an example, the cycle can correspond to one or more subframes, one or more slots, or the like in a TDD system.

In the example of FIG. 5A, one difference between signal formats 550 and 560 lie in that the guard period sizes involved are different. Different guard period sizes can be associated with different resources for terminal devices 110A and 110B, respectively. In an embodiment, the resources for different terminal devices need to have orthogonality. For example, the resource orthogonality is a resource orthogonality greater than a threshold level (if not a complete orthogonality). The resource orthogonality can be achieved at least by different beams, different frequency resources, or a combination thereof.

For example, terminal devices 110A and 110B communicate with the base station 120 through beams b1 and b2, respectively. Under these two beams, the signal propagation delay δ between the terminal device 110A and the base station 120 is smaller than the signal propagation delay δ' between the terminal device 110B and the base station 120. As such, the guard period of the terminal device 110A may be smaller than the guard period of the terminal device 110B. Since the base station 120 communicates with the terminal devices 110A and 110B through different beams (i.e., orthogonal resources) respectively, communication with the terminal devices 110A and 110B can be performed normally even if the signal formats are not completely consistent. It should be understood that, in order to prevent collision between downlink reception and uplink transmission of a terminal device, the guard period should be equal to or greater than 2 times of the propagation delay of the terminal device.

As another example, terminal devices 110A and 110B each communicate with the base station 120 over different frequency resources. The different frequency resources can be different frequency resource blocks, which may be different subcarriers or located in different frequency bands. In the case where the signal propagation delay δ between the terminal device 110A and the base station 120 is smaller than the signal propagation delay δ' between the terminal device 110B and the base station 120, the guard period of the terminal device 110A can also be set smaller than the guard period of the terminal device 110B. Since the base station 120 communicates with the terminal devices 110A and 110B through different frequency resources (i.e., orthogonal resources) respectively, communication with the terminal devices 110A and 110B can be performed normally even if the signal formats are not completely consistent. It should be understood that, in order to prevent collision between downlink reception and uplink transmission of a terminal device, the guard period should be equal to or greater than 2 times of the propagation delay of the terminal device.

In FIG. 5A, it is not necessary to set a large guard period for the entire cell based on a larger propagation delay δ'. In this way, each terminal device (in particular, the terminal device 110A) can transmit and receive signals for a longer time while ensuring that the downlink reception and the uplink transmission of each terminal device do not collide with each other. Therefore, the guard period settings at the terminal device level can significantly improve the system resource utilization efficiency. In sea area communications, there are terminal devices that are far away (e.g., 20 km) from the base station, and their propagation delay may be much longer than other terminal devices. According to the embodiment herein, it is not necessary to set the guard periods of other terminal devices based on the longer propagation delay, so that the resource utilization efficiency of other terminal devices can be improved.

FIG. 5B illustrates an additional exemplary guard period setting according to embodiments. In an embodiment, there are multiple signal formats of the physical channel for a same terminal device in the system. The base station needs to maintain synchronization with the terminal device with respect to each signal format so that the base station and the terminal device achieve alignment at the slot or symbol level of each signal format. As shown in FIG. 5B, a plurality of different signal formats 510 and 520 are configured for the terminal device 110A. Signal formats 510 and 520 include a sequence of downlink slots, a guard period, and a sequence of uplink slots, which occur repeatedly, and FIG. 5B shows only one cycle of the sequence of downlink slots, the guard period, and the sequence of uplink slots. In an example, the cycle can correspond to one or more subframes, one or more slots, or the like in a TDD system.

In the example of FIG. 5B, one difference between signal formats 510 and 520 lies in that the guard period sizes involved are different. Different guard period sizes may be respectively associated with different resources for the terminal device 110A. In an embodiment, the different resources for the terminal device 110A need to have orthogonality. For example, the resource orthogonality is a resource orthogonality greater than a threshold level (if not a complete orthogonality). The resource orthogonality can be achieved at least by different beams, different frequency resources, or a combination thereof.

For example, the terminal device 110A may communicate with the base station 120 through two beams b1 and b2. The two beams may be configured with different associated guard periods, so the terminal device 110A can communicate with the base station 120 using different signal formats. Since the base station 120 communicates with the terminal device 110A through different beams (i.e., orthogonal resources), communication with the terminal device 110A can be performed normally even if the terminal device 110A uses a plurality of signal formats that are not completely consistent. It should be understood that, in order to prevent collision between downlink reception and uplink transmission of a terminal device, the guard periods in different signal formats should be greater than or equal to 2 times of the propagation delay of the terminal device.

As another example, the terminal device 110A can communicate with the base station 120 over different frequency resources. The frequency resources can be frequency resource blocks, and different resource blocks can be different subcarriers or located in different frequency bands. Different resource blocks may be configured with different associated guard periods, so the terminal device 110A can communicate with the base station 120 using different signal formats. Since the base station 120 communicates with the terminal device 110A through different frequency resources (i.e., orthogonal resources), communication with the terminal device 110A can be performed normally even if the terminal device 110A uses a plurality of signal formats that are not completely consistent. It should be understood that, in order to prevent collision between downlink reception and uplink transmission of a terminal device, the guard periods in different signal formats should be greater than or equal to 2 times of the propagation delay of the terminal device.

In FIG. 5B, it is not necessary for different resource blocks to be associated with the same guard period. Instead, the guard periods for some resource blocks can be smaller so that they can be utilized in more time. When the resource blocks are used for the same terminal device, the terminal device can transmit and receive signals in more time, so that the utilization efficiency of system resources is significantly improved.

Figure 6:
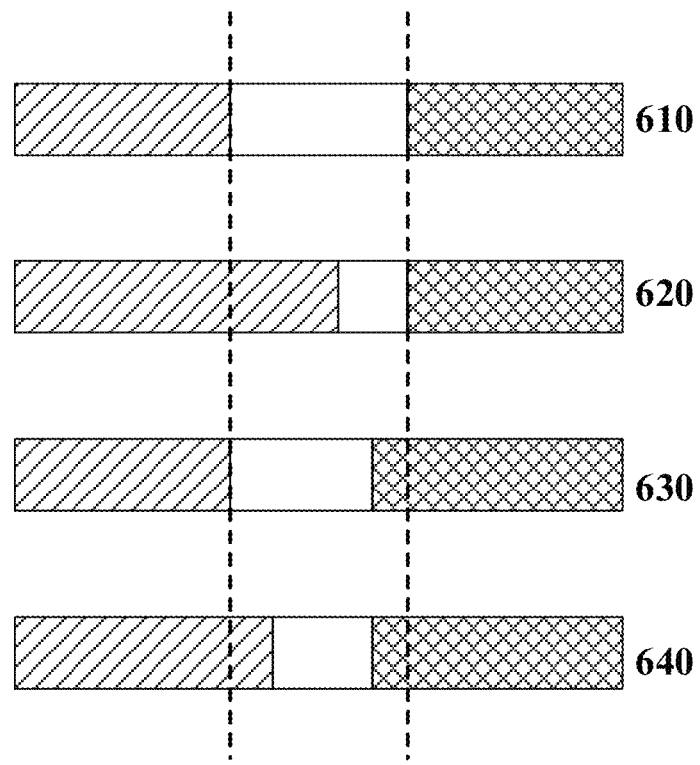

In embodiments, multiple guard periods for different terminal devices or for a same terminal device may have different sizes, and the multiple guard periods may not be aligned in time. FIG. 6 illustrates examples of different guard periods according to embodiments. As shown in FIG. 6, the guard period sizes in different signal formats are different. Of course, as mentioned above, the guard period should be greater than or equal to 2 times of the propagation delay value of the corresponding terminal device, so as to prevent collision between uplink transmission and downlink reception of the terminal device. On the premise of meeting that constraint, the transmission opportunity can be increased or decreased by reducing or increasing the size of the guard period so as to meet the actual requirement of the service. Taking the terminal device 110A as an example, if the propagation delay is δ, the length of its guard period $L_{gp} \geq 2 \times \delta$. Assuming the subcarrier interval of the system is $\Delta f$, a number N of OFDM symbols corresponding to the guard period is equal to or greater than $(2 \times \delta \times \Delta f)$ and is an integer.

Since the base station will maintain synchronization with the terminal device with respect to the different signal formats, the guard period may be located anywhere in the different signal formats. In FIG. 6, with the signal format 610 as a baseline, the guard period in the signal format 620 is biased to the uplink slot sequence, which means more downlink transmission opportunities, and is suitable for services with large downloading requirements (for example, cloud file downloading, high-definition video playback, etc.); the guard period in the signal format 630 is biased to the downlink slot sequence, which means more uplink transmission opportunities, and is suitable for services with higher uploading requirements (e.g., cloud file uploading, monitoring video backhaul, etc.); the guard period in the signal format 640 is centered with respect to the uplink and downlink slot sequences, which means more balanced uplink and downlink transmission opportunities. The resource utilization of each of signal formats 620 to 640 is greater than the baseline signal format 610.

With reference to FIG. 7, it is described below how to apply the guard period according to embodiments herein to a signal format of a legacy TDD system. A legacy TDD system may be any communication system that conforms to LTE, UMTS, and evolved standards thereof. In a legacy TDD system, a special slot is configured for downlink-to-uplink switching. As shown in FIG. 7, the special slot is located between the downlink slot sequence and the uplink slot sequence. The special slot is divided into a downlink part for downlink transmission, a guard period, and an uplink part for uplink transmission.

According to embodiments herein, the TDD system in FIG. 1 may be a legacy TDD system. The base station 120 can configure guard periods at the terminal device level. The guard periods of different terminal devices may be associated with orthogonal (different) resources. For example, the base station 120 may set a first guard period for downlink-to-uplink switching for the terminal device 110A and a different second guard period for downlink-to-uplink switching for the terminal device 110B. Different beams b1 and b2 are used for terminal devices 110A and 110B, respectively, and the first and second guard periods for downlink-to-uplink switching can be associated with beams b1 and b2, respectively. Alternatively, orthogonal (different) frequency resources are used for terminal devices 110A and 110B respectively, and the first and second guard periods for downlink-to-uplink switching may be associated with the respective frequency resources, respectively. In an embodiment, the first guard period for downlink-to-uplink switching should be greater than or equal to 2 times of the propagation delay value of the terminal device 110A, and the second guard period for downlink-to-uplink switching should be greater than or equal to 2 times of the propagation delay value of the terminal device 110B.

For another example, the base station 120 may set different first and third guard periods for downlink-to-uplink switching for a single terminal device 110A. Different beams may be used for a single terminal device 110A and the first and third guard periods for downlink-to-uplink switching may each be associated with a respective beam. Alternatively, orthogonal (different) frequency resources may be used for a single terminal device 110A, and the first and third guard periods for downlink-to-uplink switching may be associated with respective frequency resources. In an embodiment, the first guard period for downlink-to-uplink switching and the third guard period for downlink-to-uplink switching should be greater than or equal to 2 times of the propagation delay value of the terminal device 110A.

In FIG. 7, the guard period size in the slot 710 can be different based on the guard period setting. Also, the location of the guard period in the slot 710 may also be different. Different guard periods may implement different downlink parts and/or uplink parts in the respective signal formats. Thus, when more downlink transmissions are required, the downlink part can be increased, and the uplink part can be decreased (or even without the uplink part); when more uplink transmissions are required, the uplink part can be increased and the downlink part can be decreased (or even without the downlink part).

With reference to FIG. 8, it is described below how to apply the guard periods according to embodiments herein to a signal format in the NR TDD system. The NR TDD system can be any communication system that conforms to the current NR standard as well as its evolved standard. In the NR TDD system, a number of different slot formats are defined. FIG. 8 illustrates 5 exemplary slot formats 810 to 850. As shown in FIG. 8, each slot format 810 to 850 includes 14 OFDM symbols. Each OFDM symbol in the slot format can be used for uplink transmission, downlink transmission, or be flexible, according to the respective definitions. The flexible symbols can be used for uplink transmission, downlink transmission, or no transmission (e.g., as a guard period) as needed. At least one of an uplink symbol, a downlink symbol, or a flexible symbol can be included in the slot format.

According to embodiments herein, the TDD system in FIG. 1 can be an NR TDD system. The base station 120 can configure guard periods at the terminal device level. The guard periods of different terminal devices may be associated with orthogonal (different) resources. For example, the base station 120 can set a first guard period for downlink-to-uplink switching for the terminal device 110A and a different second guard period for downlink-to-uplink switching for the terminal device 110B. Different beams b1 and b2 are used for terminal devices 110A and 110B respectively, and the first and second guard periods for downlink-to-uplink switching can be associated with beams b1 and b2, respectively. Alternatively, orthogonal (different) frequency resources are used for terminal devices 110A and 110B respectively, and the first and second guard periods for downlink-to-uplink switching can be associated with the respective frequency resources respectively. In an embodiment, the first guard period for downlink-to-uplink switching should be greater than or equal to 2 times of the propagation delay value of the terminal device 110A, and the second guard period for downlink-to-uplink switching should be greater than or equal to 2 times of the propagation delay value of the terminal device 110B.

For another example, the base station 120 may set different first and third guard periods for downlink-to-uplink switching for a single terminal device 110A. Different beams can be used for a single terminal device 110A, the first and third guard periods for downlink-to-uplink switching can each be associated with a respective beam. Alternatively, orthogonal (different) frequency resources can be used for a single terminal device 110A, and the first and third guard periods for downlink-to-uplink switching can be associated with respective frequency resources. In an embodiment, the first and third guard periods for downlink-to-uplink switching should be greater than or equal to 2 times of the propagation delay value of the terminal device 110A.

In the NR TDD system, a corresponding guard period for downlink-to-uplink switching can be implemented by one or more flexible symbols. For example, the guard period can be set at the granularity of an OFDM symbol. In FIG. 8, in the case where it is determined that the terminal device uses, for example, the slot format 830, a corresponding number of flexible symbols used as a guard period are selected from the slot format 830 based on the guard period size. Moreover, the positions of the selected flexible symbols in the slot format 830 may also be different, so as to better meet the service transmission requirements in uplink and downlink.

In the NR system, the guard period may span slots. FIG. 9 illustrates an example of a guard period spanning slots according to an embodiment. Slot format 810 includes only uplink symbols and flexible symbols, slot format 820 includes only flexible symbols and downlink symbols. In FIG. 9, the adjacent slot formats 810 and 820 are configured for the terminal device. Accordingly, the guard period can be set in consecutive flexible symbols composed of the slot formats 810 and 820. In particular, in FIG. 9, the guard period occupies a portion of the flexible symbols of each of the slots 810 and 820, forming a guard period spanning the slots.

In the NR system, a corresponding pattern can be configured for the slot format, with different patterns corresponding to different transmission parameters. In FIG. 9, based on the differences in the uplink and downlink traffic characteristics, a first transmission mode is configured for the slot format 810, and a second transmission mode is configured for the slot format 820. In this way, the base station and the terminal device can use different transmission parameters to perform uplink and downlink transmission. For example, when the base station and the terminal device perform downlink transmission using the FR2 millimeter wave frequency band and perform uplink transmission using the FR1 low frequency (Sub-6 GHz) band, different parameters such as the subcarrier spacing may be selected for the uplink and the downlink, thus the slot format can be configured using different patterns. In such embodiments, the guard periods can span different patterns.

FIG. 10 illustrates an exemplary flow for setting guard periods in accordance with an embodiment herein. As shown in FIG. 10, at 1010, a preparation phase is performed between the base station 120 and the terminal device 110 to set a guard period. The preparation phase may include at least one of: initially measuring (or subsequently updating) a signal propagation delay between the terminal device 110 and the base station 120 in a random access procedure or a subsequent procedure of terminal device 110; the base station 120 allocating communication resources for uplink and downlink of the terminal device 110, for example, determining matched beams, allocating frequency resources, or the like; determining types of traffic in the uplink or downlink and transmission requirements.

At 1020, the base station 120 sends a guard period setting message to the terminal device 110. For example, the message can be sent through RRC signaling or physical layer signaling (e.g., DCI Format 2_0 signaling on a GC-PDCCH channel). With this message, a guard period specific to the terminal device 110 can be set. For example, different guard periods can be set for different terminal devices, and/or a plurality of different guard periods can be set for the same terminal device. Of course, the set guard period should be greater than or equal to 2 times of the propagation delay value of the corresponding terminal device.

FIG. 11 illustrates an exemplary method for a TDD communication system in accordance with embodiments. The method 1100 can be performed by a base station. As shown in FIG. 11, the method 1100 can include setting a first guard period for downlink-to-uplink switching for a first terminal device in a first cell (block 1105); setting a second guard period for downlink-to-uplink switching for a second terminal device in the first cell, wherein the second guard period for downlink-to-uplink switching is different from the first guard period for downlink-to-uplink switching (block 1110). In an embodiment, the first guard period for downlink-to-uplink switching is associated with a first resource, the second guard period for downlink-to-uplink switching is associated with a second resource, and the first resource and the second resource have orthogonality. Additionally or alternatively to block 1110 (shown in dashed lines to indicate optional), the method 1100 can further include setting a third guard period for downlink-to-uplink switching for the first terminal device, where the third guard period for downlink-to-uplink switching is different from the first guard period for downlink-to-uplink switching (block 1115). In an embodiment, the third guard period for downlink-to-uplink switching is associated with a third resource, and the first resource and the third resource have orthogonality. The method can be performed by the electronic device 300, and one can refer to the above description regarding the operations and functions of the electronic device 300 for detailed exemplary operations of the method, which are not repeated here.

Figure 12:
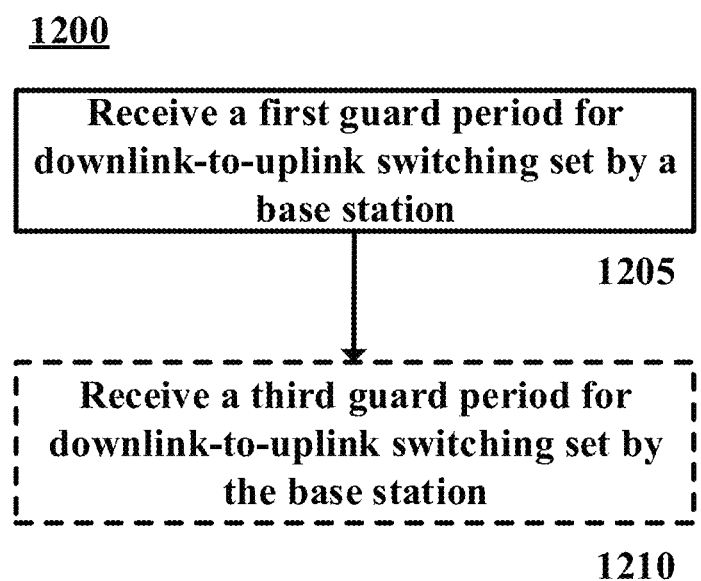

FIG. 12 illustrates another exemplary method for a TDD communication system in accordance with embodiments. The method 1200 can be performed by a terminal device. As shown in FIG. 12, the method 1200 can include receiving a first guard period for downlink-to-uplink switching set by a base station (block 1205). In an embodiment, the first guard period for downlink-to-uplink switching is different from a second guard period for downlink-to-uplink switching set by the base station for a second terminal device in a same cell, the first guard period for downlink-to-uplink switching is associated with a first resource, the second guard period for downlink-to-uplink switching is associated with a second resource, and the first resource and the second resource have orthogonality. Additionally or alternatively (shown in dashed lines to indicate optional), the method 1200 can further include receiving a third guard period for downlink-to-uplink switching set by the base station (block 1210). In an embodiment, the third guard period for downlink-to-uplink switching is different from the first guard period for downlink-to-uplink switching, the third guard period for downlink-to-uplink switching is associated with a third resource, and the first resource and the third resource have resource orthogonality. The method can be performed by the electronic device 350, and one can refer to the above description regarding the operations and functions of the electronic device 350 for detailed exemplary operations of the method, which are not repeated here.

Various exemplary electronic devices and methods according to the embodiments of the present disclosure have been described above. It should be understood that the operations or functions of these electronic devices may be combined with each other to achieve more or less operations or functions than described. The operation steps of the methods can also be combined with each other in any suitable order, so that more or fewer operations are similarly achieved than described.

It should be understood that the machine-executable instructions in the machine-readable storage medium or program product according to the embodiments of the present disclosure can be configured to perform operations corresponding to the device and method embodiments described above. When referring to the above device and method embodiments, the embodiments of the machine-readable storage medium or the program product are clear to those skilled in the art, and therefore description thereof will not be repeated herein. A machine-readable storage media and a program product for carrying or including the above-described machine-executable instructions also fall within the scope of the present disclosure. Such storage medium can comprise, but is not limited to, a floppy disk, an optical disk, a magneto-optical disk, a memory card, a memory stick, and the like.

Figure 13:
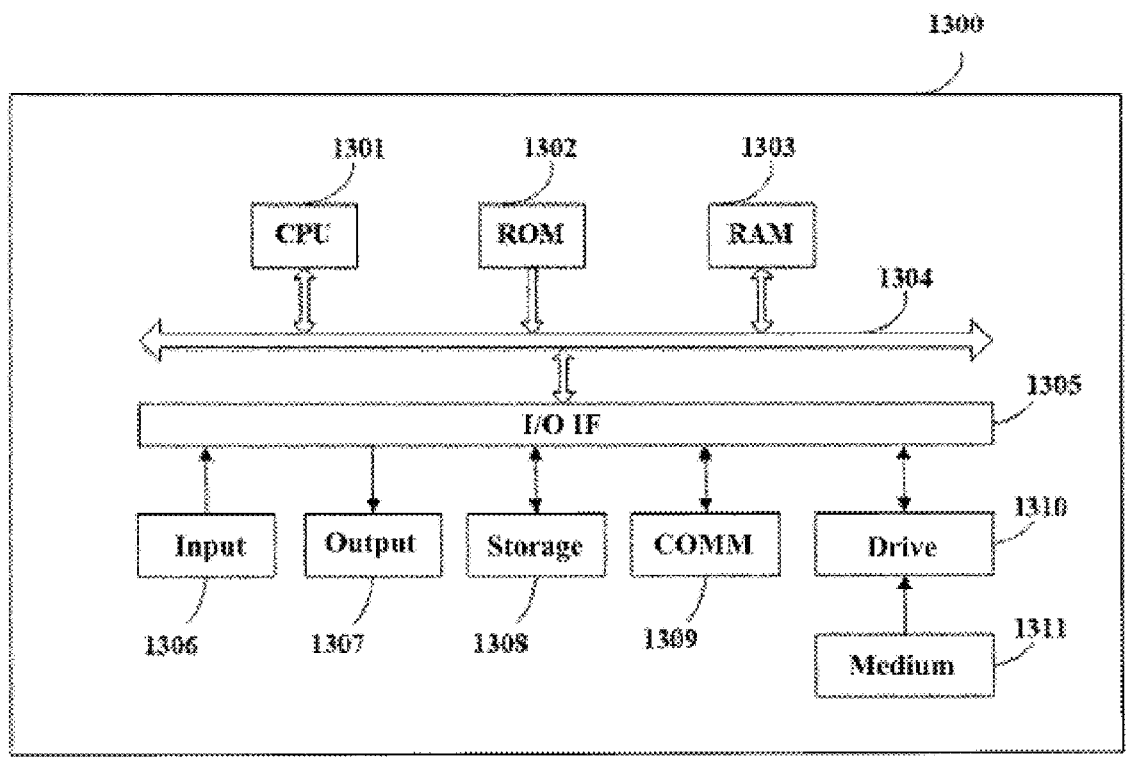
FIG. 13 is a block diagram of an example structure of a personal computer as an information processing device that can be employed in an embodiment of the present disclosure.

In addition, it should also be noted that the above series of processes and devices can also be implemented by software and/or firmware. In the case of being implemented by software and/or firmware, a program constituting the software is installed from a storage medium or a network to a computer having a dedicated hardware structure, such as the general-purpose personal computer 1300 shown in FIG.13, which, when is installed with various programs, can execute various functions and so on. FIG.13 is a block diagram showing an example structure of a personal computer which can be employed as an information processing device in the embodiment herein. In one example, the personal computer can correspond to the above-described exemplary terminal device in accordance with the present disclosure.

In FIG.13, a central processing unit (CPU) 1301 executes various processes in accordance with a program stored in a read-only memory (ROM) 1302 or a program loaded from storage 1308 to a random access memory (RAM) 1303. In the RAM 1303, data required when the CPU 1301 executes various processes and the like is also stored as needed.

The CPU 1301, the ROM 1302, and the RAM 1303 are connected to each other via a bus 1304. Input/output interface 1305 is also connected to bus 1304.

The following components are connected to the input/output interface 1305: an input unit 1306 including a keyboard, a mouse, etc.; an output unit 1307 including a display such as a cathode ray tube (CRT), a liquid crystal display (LCD), etc., and a speaker, etc.; the storage 1308 including a hard disk etc.; and a communication unit 1309 including a network interface card such as a LAN card, a modem, etc.. The communication unit 1309 performs communication processing via a network such as the Internet.

The driver 1310 is also connected to the input/output interface 1305 as needed. A removable medium 1311 such as a magnetic disk, an optical disk, a magneto-optical disk, a semiconductor memory or the like is mounted on the drive 1310 as needed, so that a computer program read therefrom is installed into the storage 1308 as needed.

In the case where the above-described series of processing is implemented by software, a program constituting the software is installed from a network such as the Internet or a storage medium such as the removable medium 1311.

It will be understood by those skilled in the art that such a storage medium is not limited to the removable medium 1311 shown in FIG.13 in which a program is stored and distributed separately from the device to provide a program to the user. Examples of the removable medium 1311 include a magnetic disk (including a floppy disk (registered trademark)), an optical disk (including a compact disk read only memory (CD-ROM) and a digital versatile disk (DVD)), a magneto-optical disk (including a mini disk (MD) (registered trademark)) and a semiconductor memory. Alternatively, the storage medium may be a ROM 1302, a hard disk included in the storage section 1308, or the like, in which programs are stored, and distributed to users together with the device containing them.

The technology of the present disclosure can be applied to various products. For example, the base stations mentioned in this disclosure can be implemented as any type of evolved Node B (gNB), such as a macro gNB and a small gNB. The small gNB can be a gNB covering a cell smaller than the macro cell, such as a pico gNB, a micro gNB, and a home (femto) gNB. Alternatively, the base station can be implemented as any other type of base station, such as a NodeB and a Base Transceiver Station (BTS). The base station can include: a body (also referred to as a base station device) configured to control radio communication; and one or more remote radio heads (RRHs) disposed at a different location from the body. In addition, various types of terminals which will be described below can each operate as a base station by performing base station functions temporarily or semi-persistently.

For example, the terminal device mentioned in the present disclosure, also referred to as user equipment in some examples, can be implemented as a mobile terminal (such as a smartphone, a tablet personal computer (PC), a notebook PC, a portable game terminal, a portable/dongle type mobile router and digital camera) or in-vehicle terminal (such as car navigation device). The user equipment may also be implemented as a terminal that performs machine-to-machine (M2M) communication (also referred to as a machine type communication (MTC) terminal). Further, the user equipment may be a radio communication module (such as an integrated circuit module including a single wafer) installed on each of the above terminals.

Use cases according to the present disclosure will be described below with reference to FIGS. 14 to 17.

[Use Cases for Base Stations]

First Use Case

Figure 14:
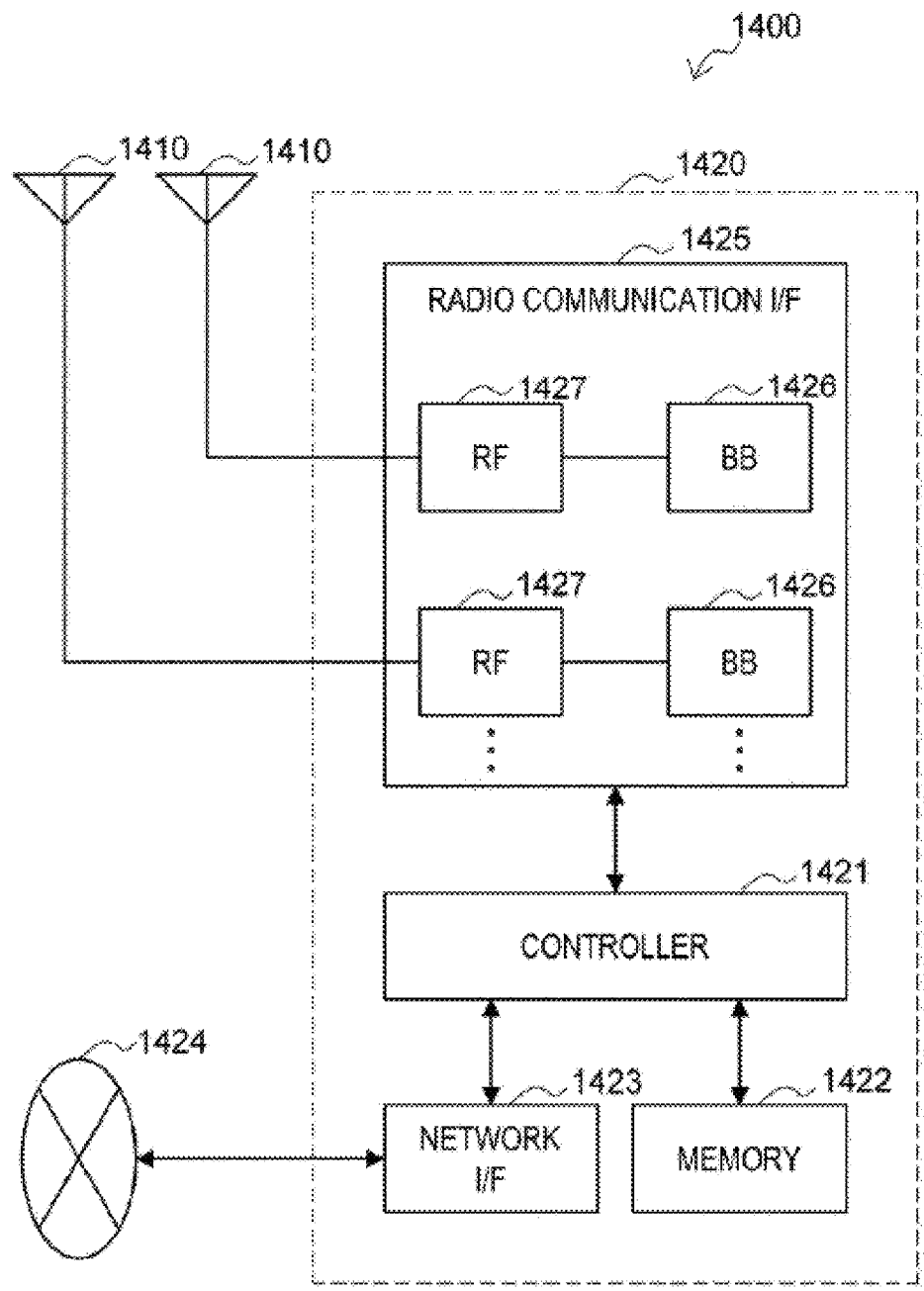
FIG. 14 is a block diagram showing a first example of a schematic configuration of a gNB to which the technology of the present disclosure can be applied.

FIG.14 is a block diagram illustrating a first example of a schematic configuration of a gNB to which the technology of the present disclosure can be applied. The gNB 1400 includes a plurality of antennas 1410 and a base station device 1420. The base station device 1420 and each antenna 1410 may be connected to each other via an RF cable. In one implementation, the gNB 1400 (or base station device 1420) herein may correspond to the electronic device 300 described above.

Each of the antennas 1410 includes a single or multiple antenna elements (such as multiple antenna elements included in a Multiple Input and Multiple Output (MIMO) antenna), and is used for the base station device 1420 to transmit and receive radio signals. As shown in FIG.14, the gNB 1400 may include multiple antennas 1410. For example, multiple antennas 1410 may be compatible with multiple frequency bands used by the gNB 1400.

The base station device 1420 includes a controller 1421, a memory 1422, a network interface 1423, and a radio communication interface 1425.

The controller 1421 may be, for example, a CPU or a DSP, and operates various functions of higher layers of the base station device 1420. For example, controller 1421 generates data packets from data in signals processed by the radio communication interface 1425, and transfers the generated packets via network interface 1423. The controller 1421 can bundle data from multiple baseband processors to generate the bundled packets, and transfer the generated bundled packets. The controller 1421 may have logic functions of performing control such as radio resource control, radio bearer control, mobility management, admission control, and scheduling. This control may be performed in corporation with a gNB or a core network node in the vicinity. The memory 1422 includes RAM and ROM, and stores a program that is executed by the controller 1421 and various types of control data such as a terminal list, transmission power data, and scheduling data.

The network interface 1423 is a communication interface for connecting the base station device 1420 to the core network 1424. Controller 1421 may communicate with a core network node or another gNB via the network interface 1423. In this case, the gNB 1400 and the core network node or other gNBs may be connected to each other through a logical interface such as an S1 interface and an X2 interface. The network interface 1423 may also be a wired communication interface or a radio communication interface for radio backhaul lines. If the network interface 1423 is a radio communication interface, the network interface 1423 may use a higher frequency band for radio communication than a frequency band used by the radio communication interface 1425.

The radio communication interface 1425 supports any cellular communication schemes, such as Long Term Evolution (LTE), LTE-Advanced and NR, and provides radio connection to a terminal positioned in a cell of the gNB 1400 via the antenna 1410. Radio communication interface 1425 may typically include, for example, a baseband (BB) processor 1426 and a RF circuit 1427. The BB processor 1426 may perform, for example, encoding/decoding, modulation/demodulation, and multiplexing/demultiplexing, and performs various types of signal processing of layers such as L1, Medium Access Control (MAC), Radio Link Control (RLC), and Packet Data Convergence Protocol (PDCP). Instead of controller 1421, the BB processor 1426 may have a part or all of the above-described logic functions. The BB processor 1426 may be a memory that stores a communication control program, or a module that includes a processor configured to execute the program and a related circuit. Updating the program may allow the functions of the BB processor 1426 to be changed. The module may be a card or a blade that is inserted into a slot of the base station device 1420. Alternatively, the module may also be a chip that is mounted on the card or the blade. Meanwhile, the RF circuit 1427 may include, for example, a mixer, a filter, and an amplifier, and transmits and receives radio signals via the antenna 1410. Although FIG.14 illustrates an example in which one RF circuit 1427 is connected to one antenna 1410, the present disclosure is not limited to thereto; rather, one RF circuit 1427 may connect to a plurality of antennas 1410 at the same time.

As illustrated in FIG.14, the radio communication interface 1425 may include the multiple BB processors 1426. For example, the multiple BB processors 1426 may be compatible with multiple frequency bands used by gNB 1400. As illustrated in FIG.14, the radio communication interface 1425 may include the multiple RF circuits 1427. For example, the multiple RF circuits 1427 may be compatible with multiple antenna elements. Although FIG.14 illustrates the example in which the radio communication interface 1425 includes the multiple BB processors 1426 and the multiple RF circuits 1427, the radio communication interface 1425 may also include a single BB processor 1426 or a single RF circuit 1427.

Second Use Case

Figure 15:
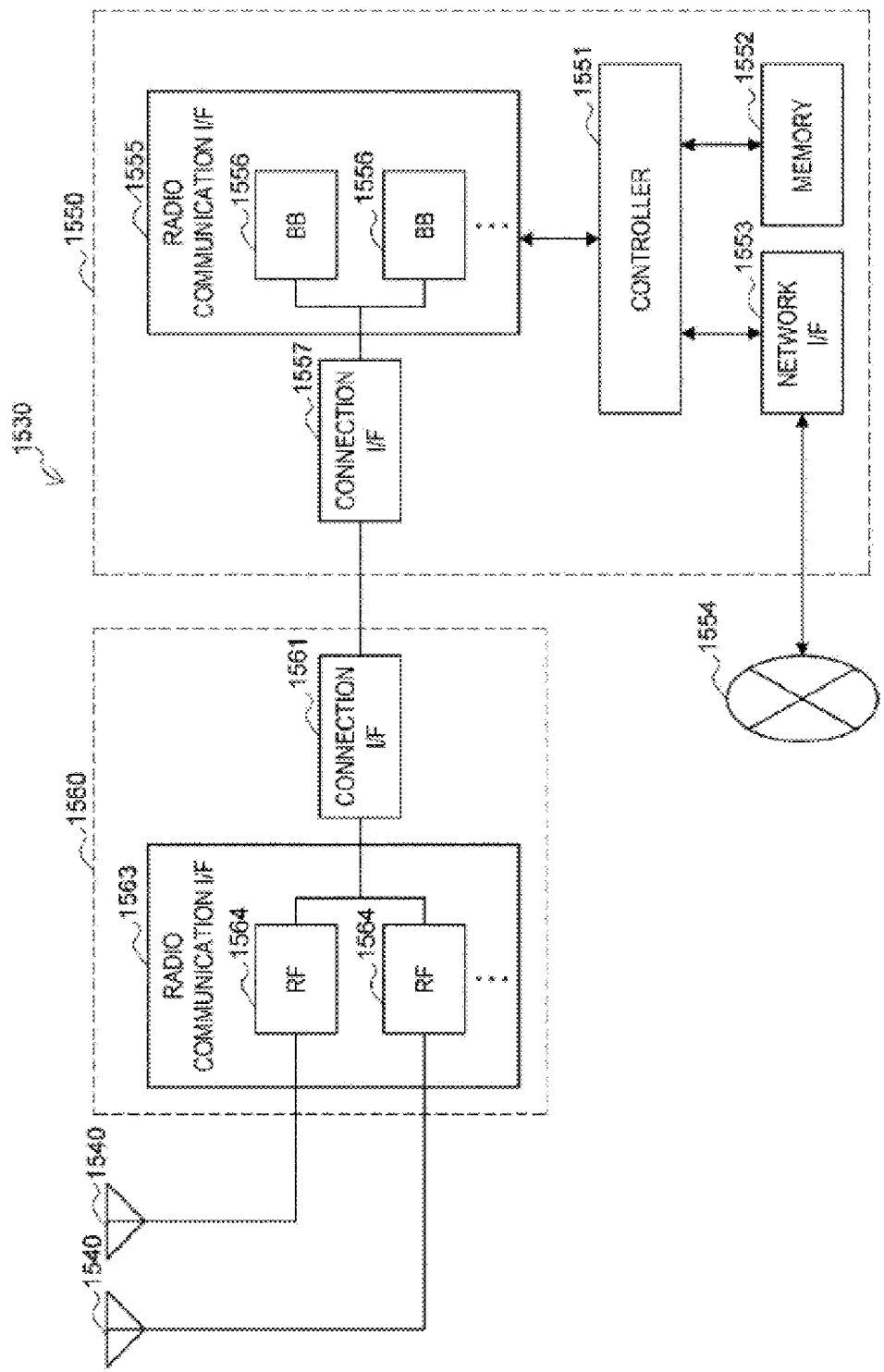
FIG. 15 is a block diagram showing a second example of a schematic configuration of a gNB to which the technology of the present disclosure can be applied.

FIG.15 is a block diagram illustrating a second example of a schematic configuration of a gNB to which the technology of the present disclosure may be applied. The gNB 1530 includes a plurality of antennas 1540, a base station device 1550, and an RRH 1560. The RRH 1560 and each antenna 1540 may be connected to each other via an RF cable. The base station device 1550 and the RRH 1560 may be connected to each other via a high speed line such as a fiber optic cable. In one implementation, the gNB 1530 (or base station device 1550) herein may correspond to the electronic device 300 described above.

Each of the antennas 1540 includes a single or multiple antenna elements such as multiple antenna elements included in a MIMO antenna and is used for the RRH 1560 to transmit and receive radio signals. The gNB 1530 may include multiple antennas 1540, as illustrated in FIG.15. For example, multiple antennas 1540 may be compatible with multiple frequency bands used by the gNB 1530.

The base station device 1550 includes a controller 1551, a memory 1552, a network interface 1553, a radio communication interface 1555, and a connection interface 1557. The controller 1551, the memory 1552, and the network interface 1553 are the same as the controller 1421, the memory 1422, and the network interface 1423 described with reference to FIG.14.

The radio communication interface 1555 supports any cellular communication scheme (such as LTE, LTE-Advanced and NR) and provides radio communication to terminals positioned in a sector corresponding to the RRH 1560 via the RRH 1560 and the antenna 1540. The radio communication interface 1555 may typically include, for example, a BB processor 1556. The BB processor 1556 is the same as the BB processor 1426 described with reference to FIG.14, except that the BB processor 1556 is connected to the RF circuit 1564 of the RRH 1560 via the connection interface 1557. The radio communication interface 1555 may include the multiple BB processors 1556, as illustrated in FIG.15. For example, the multiple BB processors 1556 may be compatible with multiple frequency bands used by the gNB 1530. Although FIG.15 illustrates the example in which the radio communication interface 1555 includes multiple BB processors 1556, the radio communication interface 1555 may also include a single BB processor 1556.

The connection interface 1557 is an interface for connecting the base station device 1550 (radio communication interface 1555) to the RRH 1560. The connection interface 1557 may also be a communication module for communication in the above-described high speed line that connects the base station device 1550 (radio communication interface 1555) to the RRH 1560.

The RRH 1560 includes a connection interface 1561 and a radio communication interface 1563.

The connection interface 1561 is an interface for connecting the RRH 1560 (radio communication interface 1563) to the base station device 1550. The connection interface 1561 may also be a communication module for communication in the above-described high speed line.

The radio communication interface 1563 transmits and receives radio signals via the antenna 1540. Radio communication interface 1563 may typically include, for example, the RF circuitry 1564. The RF circuit 1564 may include, for example, a mixer, a filter, and an amplifier, and transmits and receives radio signals via the antenna 1540. Although FIG.15 illustrates the example in which one RF circuit 1564 is connected to one antenna 1540, the present disclosure is not limited to thereto; rather, one RF circuit 1564 may connect to a plurality of antennas 1540 at the same time.

The radio communication interface 1563 may include multiple RF circuits 1564, as illustrated in FIG.15. For example, multiple RF circuits 1564 may support multiple antenna elements. Although FIG.15 illustrates the example in which the radio communication interface 1563 includes the multiple RF circuits 1564, the radio communication interface 1563 may also include a single RF circuit 1564.

[Use Cases related to User Devices]

First Use Case

Figure 16:
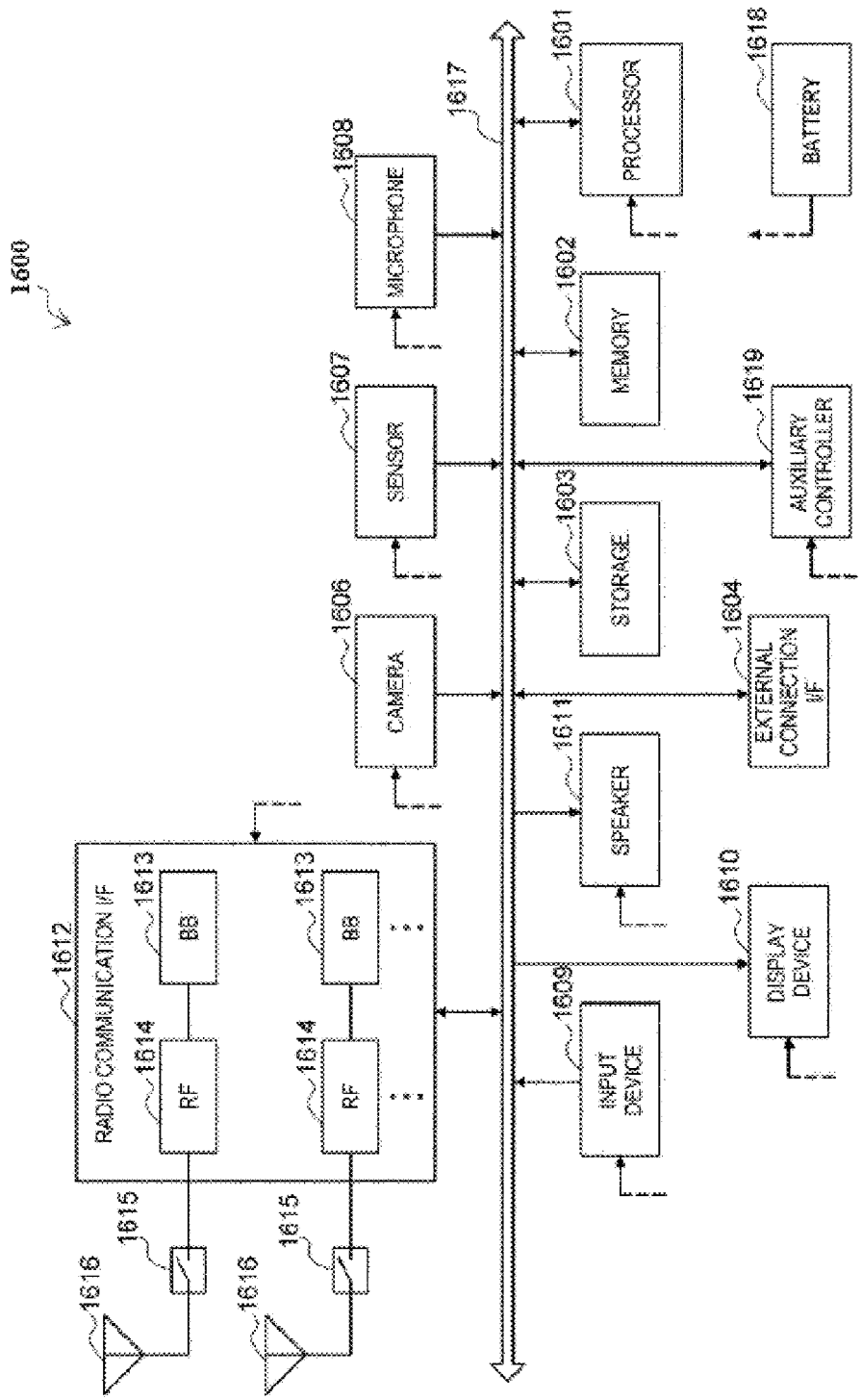
FIG. 16 is a block diagram showing an example of a schematic configuration of a smartphone to which the technology of the present disclosure can be applied.

FIG.16 is a block diagram illustrating an example of a schematic configuration of a smartphone 1600 to which the technology of the present disclosure may be applied. The smartphone 1600 includes a processor 1601, a memory 1602, a storage 1603, an external connection interface 1604, an camera 1606, a sensor 1607, a microphone 1608, an input device 1609, a display device 1610, a speaker 1611, a radio communication interface 1612, one or more antenna switch 1615, one or more antennas 1616, a bus 1617, a battery 1618, and an auxiliary controller 1619. In one implementation, smartphone 1600 (or processor 1601) herein may correspond to the electronic device 350 described above.

The processor 1601 may be, for example, a CPU or a system on chip (SoC), and controls functions of an application layer and the other layers of the smartphone 1600. The memory 1602 includes RAM and ROM, and stores a program that is executed by the processor 1601, and data. The storage 1603 may include a storage medium such as a semiconductor memory and a hard disk. The external connection interface 1604 is an interface for connecting an external device such as a memory card and a universal serial bus (USB) device to the smartphone 1600.

The camera 1606 includes an image sensor such as a charge coupled device (CCD) and a complementary metal oxide semiconductor (CMOS), and generates a captured image. Sensor 1607 may include a group of sensors such as a measurement sensor, a gyro sensor, a geomagnetic sensor, and an acceleration sensor. The microphone 1608 converts the sounds that are input to the smartphone 1600 to audio signals. The input device 1609 includes, for example, a touch sensor configured to detect touch on a screen of the display device 1610, a keypad, a keyboard, a button, or a switch, and receives an operation or an information input from a user. The display device 1610 includes a screen such as a liquid crystal display (LCD) and an organic light emitting diode (OLED) display, and displays an output image of the smartphone 1600. The speaker 1611 converts audio signals that are output from the smartphone 1600 to sounds.

The radio communication interface 1612 supports any cellular communication scheme such as LTE, LTE-Advanced and NR, and performs radio communication. The radio communication interface 1612 may typically include, for example, a BB processor 1613 and an RF circuitry 1614. The BB processor 1613 may perform, for example, encoding/decoding, modulation/demodulation, and multiplexing/demultiplexing, and performs various types of signal processing for radio communication. Meanwhile, the RF circuit 1614 may include, for example, a mixer, a filter, and an amplifier, and transmits and receives radio signals via the antenna 1616. The radio communication interface 1612 may be a one chip module that integrates the BB processor 1613 and the RF circuit 1614 thereon. The radio communication interface 1612 may include multiple BB processors 1613 and multiple RF circuits 1614, as illustrated in FIG.16. Although FIG.16 illustrates the example in which the radio communication interface 1612 includes multiple BB processors 1613 and multiple RF circuits 1614, the radio communication interface 1612 may also include a single BB processor 1613 or a single RF circuit 1614.

Furthermore, in addition to a cellular communication scheme, the radio communication interface 1612 may support additional type of radio communication schemes, such as short-range wireless communication schemes, a near field communication schemes, and a wireless local area network (LAN) scheme. In this case, the radio communication interface 1612 may include the BB processor 1613 and the RF circuitry 1614 for each radio communication scheme.

Each of the antenna switches 1615 switches connection destinations of the antenna 1616 among multiple circuits (such as circuits for different radio communication schemes) included in the radio communication interface 1612.

Each of the antennas 1616 includes a single or multiple antenna elements (such as multiple antenna elements included in a MIMO antenna) and is used for the radio communication interface 1612 to transmit and receive radio signals. The smartphone 1600 may include multiple antennas 1616, as illustrated in FIG.16. Although FIG.16 illustrates the example in which the smartphone 1600 includes multiple antennas 1616, the smartphone 1600 may also include a single antenna 1616.

Furthermore, the smartphone 1600 may include the antenna 1616 for each radio communication scheme. In this case, the antenna switch 1615 may be omitted from the configuration of the smartphone 1600.

The bus 1617 connects the processor 1601, the memory 1602, the storage 1603, the external connection interface 1604, the camera 1606, the sensor 1607, the microphone 1608, the input device 1609, the display device 1610, the speaker 1611, the radio communication interface 1612, and the auxiliary control 1619 to each other. The battery 1618 supplies power to blocks of the smartphone 1600 illustrated in FIG.16 via feeder lines, which are partially shown as a dashed line in the figure. The auxiliary controller 1619 operates a minimum necessary function of the smartphone 1600, for example, in a sleep mode.

Second Use Case

Figure 17:
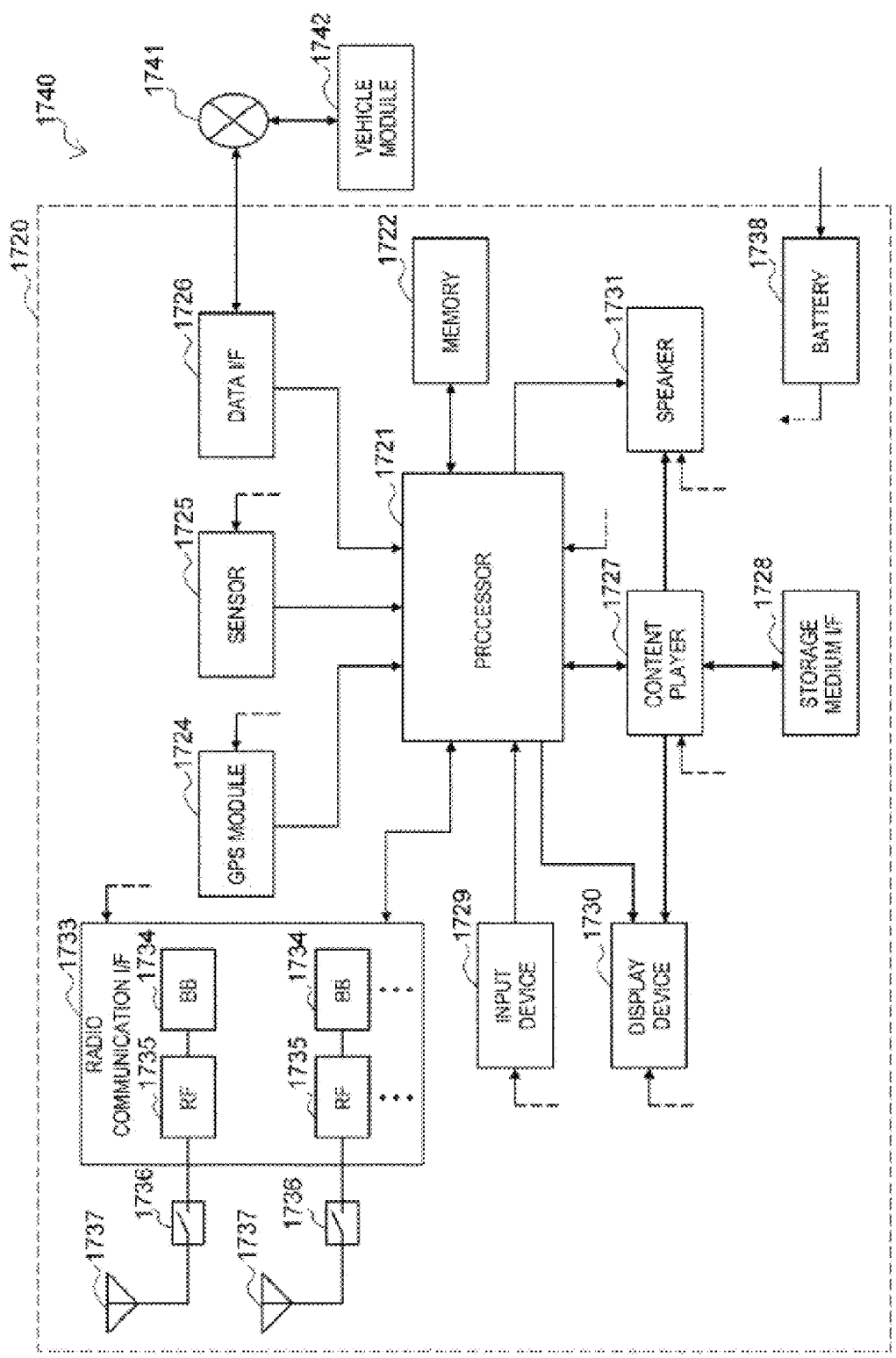
FIG. 17 is a block diagram showing an example of a schematic configuration of a car navigation device to which the technology of the present disclosure can be applied.

FIG.17 is a block diagram illustrating an example of a schematic configuration of a car navigation device 1720 to which the technology of the present disclosure may be applied. The car navigation device 1720 includes a processor 1721, a memory 1722, a global positioning system (GPS) module 1724, a sensor 1725, a data interface 1726, a content player 1727, a storage medium interface 1728, an input device 1729, a display device 1730, a speaker 1731, and a radio communication interface 1733, one or more antenna switches 1736, one or more antennas 1737, and a battery 1738. In one implementation, car navigation device 1720 (or processor 1721) herein may correspond to the electronic device 350 described above.

The processor 1721 may be, for example, a CPU or a SoC, and controls a navigation function and other functions of the car navigation device 1720. The memory 1722 includes RAM and ROM, and stores a program that is executed by the processor 1721, and data.

The GPS module 1724 uses GPS signals received from a GPS satellite to measure a position, such as latitude, longitude, and altitude, of the car navigation device 1720. Sensor 1725 may include a group of sensors such as a gyro sensor, a geomagnetic sensor, and an air pressure sensor. The data interface 1726 is connected to, for example, an in-vehicle network 1741 via a terminal not shown, and acquires data generated by the vehicle, such as vehicle speed data.

The content player 1727 reproduces content stored in a storage medium (such as a CD and a DVD) that is inserted into the storage medium interface 1728. The input device 1729 includes, for example, a touch sensor configured to detect touch on a screen of the display device 1730, a button, or a switch, and receives an operation or an information input from a user. The display device 1730 includes a screen such as an LCD or an OLED display, and displays an image of the navigation function or content that is reproduced. The speaker 1731 outputs sounds of the navigation function or the content that is reproduced.

The radio communication interface 1733 supports any cellular communication scheme, such as LTE, LTE-Advanced and NR, and performs radio communication. The radio communication interface 1733 may typically include, for example, a BB processor 1734 and an RF circuit 1735. The BB processor 1734 may perform, for example, encoding/decoding, modulation/demodulation, and multiplexing/demultiplexing, and performs various types of signal processing for radio communication. Meanwhile, the RF circuit 1735 may include, for example, a mixer, a filter, and an amplifier, and transmits and receives radio signals via the antenna 1737. The radio communication interface 1733 may also be a one chip module which integrates the BB processor 1734 and the RF circuit 1735 thereon. The radio communication interface 1733 may include multiple BB processors 1734 and multiple RF circuits 1735, as illustrated in FIG.17. Although FIG.17 illustrates the example in which the radio communication interface 1733 includes multiple BB processors 1734 and multiple RF circuits 1735, the radio communication interface 1733 may also include a single BB processor 1734 or a single RF circuit 1735.

Furthermore, in addition to a cellular communication scheme, the radio communication interface 1733 may support another type of radio communication scheme such as a short-range wireless communication scheme, a near-field communication scheme, and a wireless LAN scheme. In this case, the radio communication interface 1733 may include the BB processor 1734 and the RF circuit 1735 for each radio communication scheme.

Each of the antenna switches 1736 switches the connection destination of the antenna 1737 among multiple circuits (such as circuits for different radio communication schemes) included in the radio communication interface 1733.

Each of the antennas 1737 includes a single or multiple antenna elements, such as multiple antenna elements included in a MIMO antenna, and is used for the radio communication interface 1733 to transmit and receive radio signals. The car navigation device 1720 may include multiple antennas 1737, as illustrated in FIG.17. Although FIG.17 illustrates the example in which the car navigation device 1720 includes multiple antennas 1737, the car navigation device 1720 may also include a single antenna 1737.

Furthermore, the car navigation device 1720 may include the antenna 1737 for each radio communication scheme. In this case, the antenna switch 1736 may be omitted from the configuration of the car navigation device 1720.

The battery 1738 supplies power to blocks of the car navigation device 1720 illustrated in FIG.17 via feeder lines that are partially shown as dashed lines in the figure. Battery 1738 accumulates power supplied from the vehicle.

The technology of the present disclosure may also be realized as an in-vehicle system (or vehicle) 1740 including one or more blocks of the car navigation device 1720, the in-vehicle network 1741, and the vehicle module 1742. The vehicle module 1742 generates vehicle data such as vehicle speed, engine speed, and faults information, and outputs the generated data to the in-vehicle network 1741.

The solutions of the present disclosure may be implemented in the following exemplary manners:

1. An electronic device for a base station, wherein the base station is used in a time division duplex communication system, and the electronic device comprises a processing circuit configured to:
set a first guard period for downlink-to-uplink switching for a first terminal device in a first cell; and
set a second guard period for downlink-to-uplink switching for a second terminal device in the first cell, wherein the second guard period for downlink-to-uplink switching is different from the first guard period for downlink-to-uplink switching,
wherein the first guard period for downlink-to-uplink switching is associated with a first resource, the second guard period for downlink-to-uplink switching is associated with a second resource, and the first resource and the second resource have orthogonality.

2. The electronic device according to article 1, wherein the processing circuit is configured to:
set a third guard period for downlink-to-uplink switching for the first terminal device, where the third guard period for downlink-to-uplink switching is different from the first guard period for downlink-to-uplink switching,
wherein the third guard period for downlink-to-uplink switching is associated with a third resource, and the first resource and the third resource have orthogonality.

3. The electronic device according to article 1 or 2, wherein the orthogonality is achieved at least by different beams.

4. The electronic device according to article 1 or 2, wherein the orthogonality is achieved at least by different frequency resources.

5. The electronic device according to article 1 or 2, wherein the orthogonality is greater than a threshold level.

6. The electronic device according to article 1 or 2, wherein the processing circuit is configured to set the guard periods for downlink-to-uplink switching by the following operations:
for the first terminal device or the second terminal device, determining corresponding propagation delay, and the corresponding guard period for downlink-to-uplink switching is set to be greater than or equal to twice a value of the propagation delay.

7. The electronic device according to article 6, wherein the time division duplex communication system is a system conforming to the LTE or an evolved standard thereof, and the corresponding guard period for downlink-to-uplink switching is located in a special subframe of the system.

8. The electronic device according to article 6, wherein the time division duplex communication system is a system conforming to the NR or an evolved standard thereof, and the corresponding guard period for downlink-to-uplink switching comprises one or more flexible symbols of the system.

9. The electronic device according to article 8, wherein the corresponding guard period for downlink-to-uplink switching comprises different parameter set configurations.

10. The electronic device according to article 7 or 8, wherein the processing circuit is configured to notify the corresponding guard period for downlink-to-uplink switching through a terminal device-specific signaling.

11. An electronic device for a first terminal device, wherein the first terminal device is used in a time division duplex communication system, and the electronic device comprises a processing circuit configured to:
receive a first guard period for downlink-to-uplink switching set by a base station, wherein the first guard period for downlink-to-uplink switching is different from a second guard period for downlink-to-uplink switching set by the base station for a second terminal device in a same cell,
wherein the first guard period for downlink-to-uplink switching is associated with a first resource, the second guard period for downlink-to-uplink switching is associated with a second resource, and the first resource and the second resource have orthogonality.

12. The electronic device according to article 11, wherein the processing circuit is configured to:
receive a third guard period for downlink-to-uplink switching set by the base station, where the third guard period for downlink-to-uplink switching is different from the first guard period for downlink-to-uplink switching,
wherein the third guard period for downlink-to-uplink switching is associated with a third resource, and the first resource and the third resource have orthogonality.

13. The electronic device according to article 11 or 12, wherein the orthogonality is achieved at least by different beams.

14. The electronic device according to article 11 or 12, wherein the orthogonality is achieved at least by different frequency resources.

15. The electronic device according to article 11 or 12, wherein the orthogonality is greater than a threshold level.

16. The electronic device according to article 11 or 12, wherein the first and third guard periods for downlink-to-uplink switching are greater than or equal to twice a value of a propagation delay of the first terminal device.

17. The electronic device according to article 16, wherein the time division duplex communication system is a system conforming to the LTE or an evolved standard thereof, and the corresponding guard period for downlink-to-uplink switching is located in a special subframe of the system.

18. The electronic device according to article 16, wherein the time division duplex communication system is a system conforming to the NR or an evolved standard thereof, and the corresponding guard period for downlink-to-uplink switching comprises one or more flexible symbols of the system.

19. The electronic device according to article 18, wherein the corresponding guard period for downlink-to-uplink switching comprises different parameter set configurations.

20. The electronic device according to article 17 or 18, wherein the processing circuit is configured to receive the corresponding guard period for downlink-to-uplink switching through a terminal device-specific signaling.

21. A method for a time division duplex communication system, comprising by a base station:
setting a first guard period for downlink-to-uplink switching for a first terminal device in a first cell; and
setting a second guard period for downlink-to-uplink switching for a second terminal device in the first cell, wherein the second guard period for downlink-to-uplink switching is different from the first guard period for downlink-to-uplink switching,
wherein the first guard period for downlink-to-uplink switching is associated with a first resource, the second guard period for downlink-to-uplink switching is associated with a second resource, and the first resource and the second resource have orthogonality.

22. The method according to article 21, further comprising by the base station:
setting a third guard period for downlink-to-uplink switching for the first terminal device, where the third guard period for downlink-to-uplink switching is different from the first guard period for downlink-to-uplink switching,
wherein the third guard period for downlink-to-uplink switching is associated with a third resource, and the first resource and the third resource have orthogonality.

23. A method for a time division duplex communication system, comprising by a first terminal device:
receiving a first guard period for downlink-to-uplink switching set by a base station, wherein the first guard period for downlink-to-uplink switching is different from a second guard period for downlink-to-uplink switching set by the base station for a second terminal device in a same cell,
wherein the first guard period for downlink-to-uplink switching is associated with a first resource, the second guard period for downlink-to-uplink switching is associated with a second resource, and the first resource and the second resource have orthogonality.

24. The method according to article 23, further comprising by the first terminal device:
receiving a third guard period for downlink-to-uplink switching set by the base station, where the third guard period for downlink-to-uplink switching is different from the first guard period for downlink-to-uplink switching,
wherein the third guard period for downlink-to-uplink switching is associated with a third resource, and the first resource and the third resource have orthogonality.

25. A computer-readable storage medium storing one or more instructions that, when executed by one or more processors of an electronic device, cause the electronic device to perform the method of any one of articles 21 to 24.

26. An apparatus for wireless communication, comprising a unit for performing the method of any one of articles 21 to 24.

The exemplary embodiments of the present disclosure have been described above with reference to the drawings, but the present disclosure is of course not limited to the above examples. Those skilled in the art can obtain various changes and modifications within the scope of the appended claims, and it should be understood that these changes and modifications will naturally fall within the technical scope of the present disclosure.

For example, a plurality of functions included in one unit in the above embodiments may be implemented by separate devices. Alternatively, the multiple functions implemented by the multiple units in the above embodiments may be implemented by separate devices, respectively. In addition, one of the above functions can be realized by multiple units. Needless to say, such a configuration is included in the technical scope of the present disclosure.

In this specification, the steps described in the flowchart include not only processes performed in time series in the described order, but also processes performed in parallel or individually rather than necessarily in time series. In addition, even in the steps processed in time series, needless to say, the order can be changed appropriately.

Although the present disclosure and its advantages have been described in detail, it should be understood that various modifications, replacements, and changes can be made without departing from the spirit and scope of the present disclosure as defined by the appended claims. Moreover, the terms "include", "comprise", or their any other variant in the embodiments of the present disclosure is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element preceded by "includes a . . . " does not, without more constraints, preclude the existence of additional identical elements in the process, method, article, or apparatus that includes the element.

The invention claimed is:
1. An electronic device for a base station used in a time division duplex communication system, comprising:
processing circuitry configured to
set a first guard period for downlink-to-uplink switching for a first terminal device in a first cell,
set a second guard period for downlink-to-uplink switching for a second terminal device in the first cell, wherein the second guard period for downlink-to-uplink switching is different from the first guard period for downlink-to-uplink switching, and
set a third guard period for downlink-to-uplink switching for the first terminal device, where the third guard period for downlink-to-uplink switching is different from the first guard period for downlink-to-uplink switching, wherein the first guard period for downlink-to-uplink switching is associated with a first resource, the second guard period for downlink-to-uplink switching is associated with a second resource, and the first resource and the second resource have orthogonality, and wherein the third guard period for downlink-to-uplink switching is associated with a third resource, and the first resource and the third resource have orthogonality.

2. The electronic device according to claim 1, wherein the orthogonality is achieved at least by different beams or different frequency resources; and/or wherein the orthogonality is greater than a threshold level.

3. The electronic device according to claim 1, wherein the processing circuitry is configured to set the guard periods for downlink-to-uplink switching by the following operations:

for the first terminal device or the second terminal device, determining corresponding propagation delay, and the corresponding guard period for downlink-to-uplink switching is set to be greater than or equal to twice a value of the propagation delay.

4. The electronic device according to claim 3, wherein the time division duplex communication system is a system conforming to the LTE or an evolved standard thereof, and the corresponding guard period for downlink-to-uplink switching is located in a special subframe of the system.

5. The electronic device according to claim 4, wherein the processing circuitry is configured to notify the corresponding guard period for downlink-to-uplink switching through a terminal device-specific signaling.

6. The electronic device according to claim 3, wherein the time division duplex communication system is a system conforming to the NR or an evolved standard thereof, and the corresponding guard period for downlink-to-uplink switching comprises one or more flexible symbols of the system.

7. The electronic device according to claim 6, wherein the corresponding guard period for downlink-to-uplink switching comprises different parameter set configurations.

8. An electronic device for a first terminal device used in a time division duplex communication system, comprising:
processing circuitry configured to
receive a first guard period for downlink-to-uplink switching set by a base station, wherein the first guard period for downlink-to-uplink switching is different from a second guard period for downlink-to-uplink switching set by the base station for a second terminal device in a same cell, and
receive a third guard period for downlink-to-uplink switching set by the base station, where the third guard period for downlink-to-uplink switching is different from the first guard period for downlink-to-uplink switching,
wherein the first guard period for downlink-to-uplink switching is associated with a first resource, the second guard period for downlink-to-uplink switching is associated with a second resource, and the first resource and the second resource have orthogonality. and
wherein the third guard period for downlink-to-uplink switching is associated with a third resource, and the first resource and the third resource have orthogonality.

9. The electronic device according to claim 8, wherein the orthogonality is achieved at least by different beams or different frequency resources; and/or
wherein the orthogonality is greater than a threshold level.

10. The electronic device according to claim 8, wherein the first and third guard periods for downlink-to-uplink switching are greater than or equal to twice a value of a propagation delay of the first terminal device.

11. The electronic device according to claim 10, wherein the time division duplex communication system is a system conforming to the LTE or an evolved standard thereof, and the corresponding guard period for downlink-to-uplink switching is located in a special subframe of the system.

12. The electronic device according to claim 11, wherein the processing circuitry is configured to receive the corresponding guard period for downlink-to-uplink switching through a terminal device-specific signaling.

13. The electronic device according to claim 10, wherein the time division duplex communication system is a system conforming to the NR or an evolved standard thereof, and the corresponding guard period for downlink-to-uplink switching comprises one or more flexible symbols of the system.

14. The electronic device according to claim 13, wherein the corresponding guard period for downlink-to-uplink switching comprises different parameter set configurations.

15. A method for a time division duplex communication system, performed by a base station, comprising:
setting a first guard period for downlink-to-uplink switching for a first terminal device in a first cell;
setting a second guard period for downlink-to-uplink switching for a second terminal device in the first cell, wherein the second guard period for downlink-to-uplink switching is different from the first guard period for downlink-to-uplink switching; and
setting a third guard period for downlink-to-uplink switching for the first terminal device, where the third guard period for downlink-to-uplink switching is different from the first guard period for downlink-to-uplink switching,
wherein the first guard period for downlink-to-uplink switching is associated with a first resource, the second guard period for downlink-to-uplink switching is associated with a second resource, and the first resource and the second resource have orthogonality, and
wherein the third guard period for downlink-to-uplink switching is associated with a third resource, and the first resource and the third resource have orthogonality.

16. A method for a time division duplex communication system, performed by a first terminal device, comprising:
receiving a first guard period for downlink-to-uplink switching set by a base station, wherein the first guard period for downlink-to-uplink switching is different from a second guard period for downlink-to-uplink switching set by the base station for a second terminal device in a same cell; and
receiving a third guard period for downlink-to-uplink switching set by the base station, where the third guard period for downlink-to-uplink switching is different from the first guard period for downlink-to-uplink switching,
wherein the first guard period for downlink-to-uplink switching is associated with a first resource, the second guard period for downlink-to-uplink switching is associated with a second resource, and the first resource and the second resource have orthogonality, and
wherein the third guard period for downlink-to-uplink switching is associated with a third resource, and the first resource and the third resource have orthogonality.

* * * * *